United States Patent
Gruschow et al.

(10) Patent No.: US 9,995,255 B2
(45) Date of Patent: Jun. 12, 2018

(54) MULTI-FUEL ENGINE SYSTEM

(71) Applicant: General Electric Company, Schenectady, NY (US)

(72) Inventors: Alexis Gruschow, Harborcreek, PA (US); Leslie Orin Trask, McKean, PA (US); Eric Richard Dillen, Edinboro, PA (US); John Stephen Roth, Millcreek, PA (US); Matthew Joseph Felion, Grove City, PA (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 14/600,604

(22) Filed: Jan. 20, 2015

(65) Prior Publication Data
US 2015/0204284 A1 Jul. 23, 2015

Related U.S. Application Data

(60) Provisional application No. 61/929,642, filed on Jan. 21, 2014.

(51) Int. Cl.
*F01P 9/00* (2006.01)
*F02M 35/10* (2006.01)
(Continued)

(52) U.S. Cl.
CPC ..... *F02M 35/10288* (2013.01); *F02D 19/105* (2013.01); *F02D 41/0027* (2013.01); *F02M 21/023* (2013.01); *F02M 21/029* (2013.01); *F02M 21/0278* (2013.01); *F02M 21/0281* (2013.01); *F02M 21/04* (2013.01); *F02M 21/042* (2013.01); *F02M 35/10262* (2013.01); *F02M 35/116* (2013.01);
(Continued)

(58) Field of Classification Search
CPC .... F01P 3/20; F01P 11/04; F01P 11/06; F01P 2007/146; F01P 2060/08; F02M 35/10321; F02M 35/10144; F02M 35/112; F02M 35/10347; F05C 2225/08
USPC ...................................................... 123/41.01
See application file for complete search history.

(56) References Cited

U.S. PATENT DOCUMENTS 4,242,999 A 1/1981 Hoser
4,686,944 A * 8/1987 Hiraoka ................. F02B 27/00
                                                    123/184.34
(Continued)

FOREIGN PATENT DOCUMENTS

DE       4447832 B4    11/2006
JP    2007023986 A     2/2007

OTHER PUBLICATIONS

International Search Report and Written Opinion issued in connection with corresponding PCT Application No. PCT/US2015/012121 dated Apr. 28, 2015.
U.S. Non-Final Office Action issued in connection with corresponding U.S. Appl. No. 14/600,736 dated Aug. 29, 2016.
European Search Report and Opinion issued in connection with corresponding EP Application No. 15739875.1 dated Jul. 11, 2017.

*Primary Examiner* — Jacob Amick
*Assistant Examiner* — Charles Brauch
(74) *Attorney, Agent, or Firm* — GE Global Patent Operation; John A. Kramer

(57) ABSTRACT

Various methods and systems are provided for an intake manifold for an engine. In one example, the intake manifold comprises a first passage for supplying intake air to a plurality of cylinders of the engine and a second passage for supplying gaseous fuel to the plurality of cylinders.

20 Claims, 17 Drawing Sheets

(51) Int. Cl.
*F02M 35/16* (2006.01)
*F02M 21/04* (2006.01)
*F02M 21/02* (2006.01)
*F02M 35/116* (2006.01)
*F02D 19/10* (2006.01)
*F02D 41/00* (2006.01)
*F01P 3/20* (2006.01)
*F01P 7/14* (2006.01)
*F01P 11/04* (2006.01)
*F01P 11/06* (2006.01)
*F02M 35/112* (2006.01)
*F02F 1/24* (2006.01)
*F02B 75/22* (2006.01)
*F02B 75/18* (2006.01)
*F02M 26/05* (2016.01)

(52) U.S. Cl.
CPC ............. *F02M 35/164* (2013.01); *F01P 3/20* (2013.01); *F01P 11/04* (2013.01); *F01P 11/06* (2013.01); *F01P 2007/146* (2013.01); *F01P 2060/08* (2013.01); *F01P 2060/10* (2013.01); *F02B 75/22* (2013.01); *F02B 2075/1848* (2013.01); *F02B 2201/064* (2013.01); *F02F 1/24* (2013.01); *F02M 26/05* (2016.02); *F02M 35/10144* (2013.01); *F02M 35/10268* (2013.01); *F02M 35/10321* (2013.01); *F02M 35/10347* (2013.01); *F02M 35/112* (2013.01); *F05C 2225/08* (2013.01); *Y02T 10/146* (2013.01); *Y02T 10/32* (2013.01); *Y02T 10/36* (2013.01)

(56) References Cited

U.S. PATENT DOCUMENTS

| | | | |
|---|---|---|---|
| 4,745,890 A | 5/1988 | Wyczalek et al. | |
| 4,805,564 A | 2/1989 | Hudson, Jr. | |
| 5,040,493 A * | 8/1991 | Gajewski | F01P 3/12 123/184.54 |
| 5,408,978 A | 4/1995 | Davis | |
| 5,526,797 A | 6/1996 | Stokes | |
| 5,662,077 A | 9/1997 | Boswell | |
| 5,713,336 A | 2/1998 | King et al. | |
| 6,427,660 B1 | 8/2002 | Yang | |
| 6,793,870 B1 * | 9/2004 | Brodesser | B29C 45/14311 264/250 |
| 7,019,626 B1 | 3/2006 | Funk | |
| 7,299,787 B2 | 11/2007 | Sasaki et al. | |
| 2005/0051138 A1 | 3/2005 | Haley et al. | |
| 2006/0107934 A1 | 5/2006 | Boveia | |
| 2007/0119412 A1 | 5/2007 | Leone et al. | |
| 2007/0137601 A1 | 6/2007 | Stanglmaier | |
| 2008/0053391 A1* | 3/2008 | Hayashi | F02B 27/02 123/184.21 |
| 2008/0184964 A1* | 8/2008 | Parish | F02M 21/0278 123/470 |
| 2011/0132310 A1 | 6/2011 | Born et al. | |
| 2011/0186013 A1 | 8/2011 | Sasaki | |
| 2011/0226445 A1* | 9/2011 | Brand | H05K 7/20254 165/70 |
| 2011/0315101 A1 | 12/2011 | Cleary et al. | |
| 2012/0037101 A1 | 2/2012 | Riegger et al. | |
| 2012/0041665 A1* | 2/2012 | Pursifull | F01B 1/02 701/103 |

* cited by examiner

MULTI-FUEL ENGINE SYSTEM

RELATED APPLICATIONS

This application claims priority to U.S. Provisional Application No. 61/929,642, filed Jan. 21, 2014, the entire contents of which are hereby incorporated by reference for all purposes.

FIELD

Embodiments of the subject matter disclosed herein relate to an engine, engine components, and an engine system, for example.

BACKGROUND

Vehicles, such as locomotives, may include a prime mover that is powered by a fuel source to generate mechanical energy. In one example, mechanical energy generated by the prime mover may be converted to electrical energy that is used to power traction motors and other components and systems of the vehicle. In some examples, the prime mover may be a combustion engine that is fueled by diesel, gasoline, or other liquid petroleum distillates. In other examples the engine may additionally or alternatively utilize a gaseous fuel, such as natural gas.

In light of its favorable energy content, natural gas may be used as a fuel source for an engine. However, many existing engines are typically configured with only a single, liquid (e.g., diesel) fuel supply, limiting the opportunities for operating engines with natural gas. One example approach for supplying gaseous fuel to a diesel engine includes admitting gaseous fuel via the intake runners on each cylinder head. However, such an approach may be costly and difficult to apply to existing engine architectures, even on a small scale. Without significant redesign, the modifications required to the cylinder head may compromise the integrity of the head casting and likely result in reduced durability.

BRIEF DESCRIPTION

In one embodiment, an intake manifold for an engine includes a first passage providing a first pathway through the intake manifold for supplying intake air to a plurality of cylinders of the engine and a second passage providing a second pathway through the intake manifold for supplying gaseous fuel to at least one of the plurality of cylinders.

In some examples, the intake manifold further comprises at least one gas admission valve mounted to the second passage configured to control a flow rate of the gaseous fuel to the at least one of the plurality of cylinders.

In this way, the intake manifold is configured to introduce gaseous fuel (e.g., natural gas) to the cylinders without the need for redesigning each cylinder head of the engine. As such, vehicles that are currently configured to operate with only diesel fuel (for example) may be retrofitted to operate with both diesel fuel and natural gas, while minimizing engine modifications to achieve the benefit of lower cost fuel.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of an intake manifold to supply intake air and gaseous fuel to a plurality of cylinders of a multi-cylinder engine. In other embodiments, the intake manifold further comprises a coolant outlet to direct coolant from the engine to a coolant system component, such as a heat exchanger or other component. One or more cylinders of the plurality of cylinders may be supplied with the gaseous fuel via respective gas admission valves mounted on the intake manifold. By supplying the gaseous fuel via the intake manifold, a single gas supply passage and internal gas routing to power assemblies may be provided, reducing the potential number of gas-sealing joints and thus the potential for leakage of gaseous fuel out of the engine. The intake manifold also provides gas admission geometry flexibility for air-gas mixing optimization. Additionally, mounting the gas admission valves on the intake manifold, as opposed to other locations (such as the cylinder heads), provides a more favorable vibration environment, potentially reducing concerns of valve reliability. Further, the addition of the gas passage to the manifold causes no serviceability impacts on other engine components. From a commercial standpoint, supplying gaseous fuel via the intake manifold may require fewer dual fuel upgrade components to be purchased, for specific engine architectures. Further still, by retrofitting the intake manifold, in this engine application, rather than each individual cylinder head, the cost of the retrofitting may be reduced.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a self-propelled rail vehicle, and more broadly, as an example of a mobile platform, supporting a system incorporating an embodiment of the invention.

Figure 1:
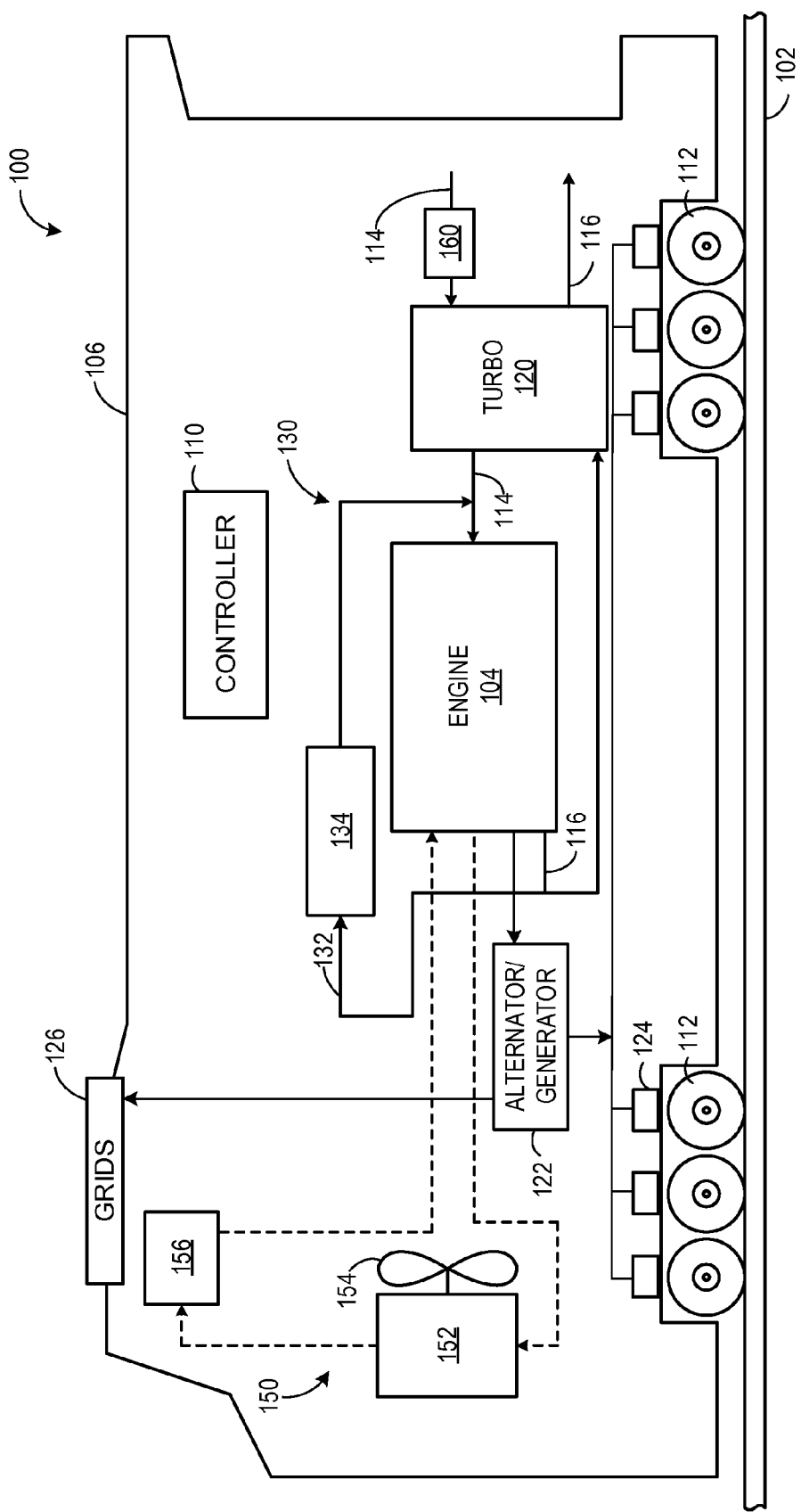
FIG. 1 shows a schematic diagram of an embodiment of a rail vehicle with an engine.

Before further discussion of the approach for providing gaseous fuel to a diesel engine, an example of a platform is disclosed in which an engine may be configured for a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 receives ambient air from an air filter 160 that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may additionally combust fuel including gasoline, kerosene, natural gas, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 122 and electric traction motors 124. For example, the engine 104 is a diesel and/or natural gas engine that generates a torque output that is transmitted to the generator 122 which is mechanically coupled to the engine 104. In one embodiment herein, engine 104 is a multi-fuel engine operating with diesel fuel and natural gas, but in other examples engine 104 may use various combinations of fuels other than diesel and natural gas.

The generator 122 produces electrical power that may be stored and applied for subsequent propagation to a variety of downstream electrical components. As an example, the generator 122 may be electrically coupled to a plurality of traction motors 124 and the generator 122 may provide electrical power to the plurality of traction motors 124. As depicted, the plurality of traction motors 124 are each connected to one of a plurality of wheels 112 to provide tractive power to propel the rail vehicle 106. One example configuration includes one traction motor per wheel set. As depicted herein, six pairs of traction motors correspond to each of six pairs of motive wheels of the rail vehicle. In another example, alternator/generator 122 may be coupled to one or more resistive grids 126. The resistive grids 126 may be configured to dissipate excess engine torque via heat produced by the grids from electricity generated by alternator/generator 122.

In some embodiments, the vehicle system 100 may include a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

In some embodiments, the vehicle system 100 may further include an aftertreatment system (illustrated in FIG. 3 as aftertreatment device 314) coupled in the exhaust passage upstream and/or downstream of the turbocharger 120. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system 100 may further include an exhaust gas recirculation (EGR) system 130 coupled to the engine 104, which routes exhaust gas from an exhaust passage 116 of the engine 104 to the intake passage 114 downstream of the turbocharger 120. In some embodiments, the exhaust gas recirculation system 130 may be coupled exclusively to a group of one or more donor cylinders of the engine (also referred to a donor cylinder system). As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., $NO_x$).

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by the controller 110, or it may control a variable amount of EGR, for example. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the vehicle 106 is moving slowly or stopped while the engine is running. In some examples, fan speed may be controlled by a controller, such as controller 110. Coolant which is cooled by the radiator 152 enters a tank 156. The coolant may then be pumped by a water, or coolant, pump (not shown) back to the engine 104 or to another component of the vehicle system, such as the EGR cooler.

The rail vehicle 106 further includes an engine controller 110 (referred to hereafter as the controller) to control various components related to the rail vehicle 106. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of rail vehicle operation.

The controller 110 may receive information from a plurality of sensors and may send control signals to a plurality of actuators. The controller 110, while overseeing control and management of the rail vehicle 106, may be configured to receive signals from a variety of engine sensors, as further elaborated herein, in order to determine operating parameters and operating conditions, and correspondingly adjust various engine actuators to control operation of the rail vehicle 106. For example, the engine controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas temperature in the EGR cooler, or the like. Correspondingly, the controller 110 may control the rail vehicle 106 by sending commands to various components such as the traction motors 124, the alternator/generator 122, cylinder valves, fuel injectors, a notch throttle, or the like. Other actuators may be coupled to various locations in the rail vehicle.

Figure 2:
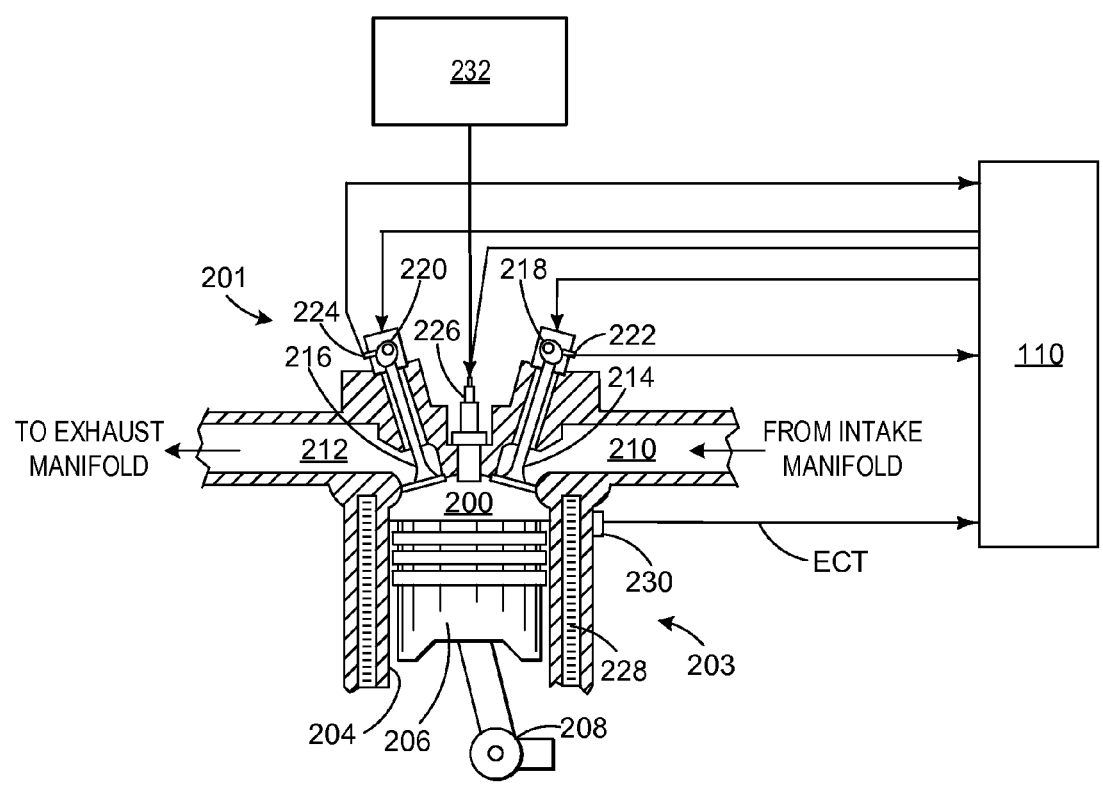
FIG. 2 shows a schematic diagram of a cylinder of the engine of FIG. 1.

FIG. 2 depicts an embodiment of a combustion chamber, or cylinder 200, of a multi-cylinder internal combustion engine, such as the engine 104 described above with reference to FIG. 1. Cylinder 200 may be defined by a cylinder head 201, housing the intake and exhaust valves and fuel injector, described below, and a cylinder block 203. As shown in more detail in FIGS. 4-5, each cylinder of the multi-cylinder engine may include a separate cylinder head coupled to a common cylinder block.

The engine may be controlled at least partially by a control system including controller 110 which may be in further communication with a vehicle system, such as the vehicle system 100 described above with reference to FIG. 1. As described above, the controller 110 may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller 110 may control the vehicle system by sending commands to various components such as alternator, cylinder valves, throttle, fuel injectors, etc.

The cylinder (i.e., combustion chamber) 200 may include combustion chamber walls 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake runner 210. The intake runner 210 receives intake air via an intake manifold. The intake runner 210 may communicate with other cylinders of the engine in addition to the cylinder 200, for example, or the intake runner 210 may communicate exclusively with the cylinder 200.

Exhaust gas resulting from combustion in the engine is supplied to an exhaust including an exhaust runner 212. Exhaust gas flows through the exhaust runner 212, to a turbocharger in some embodiments (not shown in FIG. 2) and to atmosphere, via an exhaust manifold. The exhaust runner 212 may further receive exhaust gases from other cylinders of the engine in addition to the cylinder 200, for example.

Each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 110 via an actuator 218. Similarly, the exhaust valve 216 may be controlled by the controller 110 via an actuator 220. During some conditions, the controller 110 may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank 232, fuel pumps, and a fuel rail (not shown). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). Further, as explained in more detail below, one or more cylinders of the engine may be configured to receive gaseous fuel (e.g., natural gas) alternative to or in addition to diesel fuel. The gaseous fuel may be provided to cylinder 200 via the intake manifold, as explained below.

Figure 3:
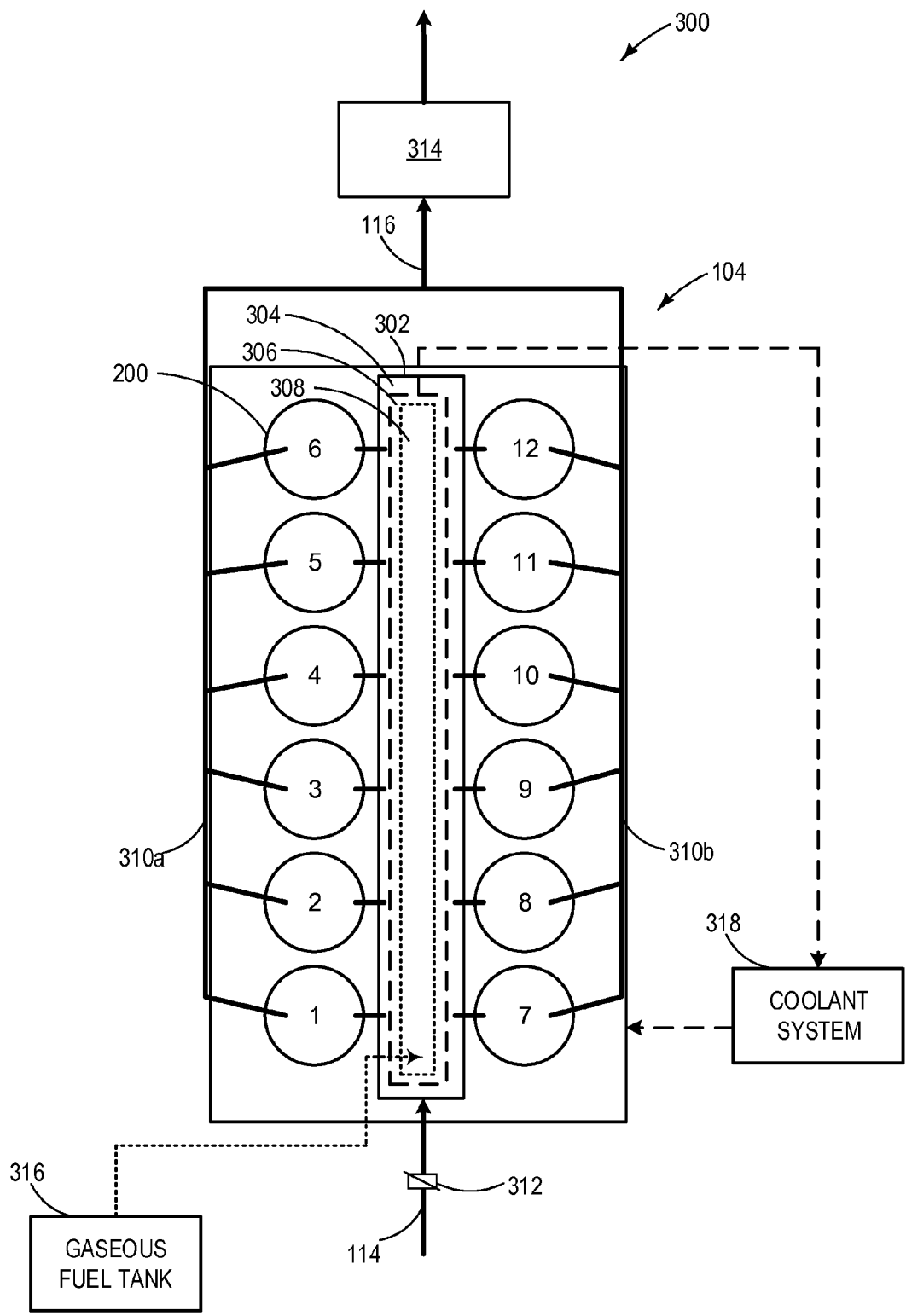
FIGS. 3-4 show schematic diagrams of an engine system including the engine of FIG. 1.

FIG. 3 shows a schematic diagram of an engine system 300 including multi-cylinder engine 104 having a plurality of cylinders 200. Thus, the engine system 300 includes the engine 104 described above with respect to FIG. 1. The engine 104 receives intake air for combustion from intake manifold 302. Intake manifold 302 receives intake air from intake passage 114, which receives ambient air from an air filter (shown in FIG. 1) that filters air from outside of a vehicle in which the engine 104 may be positioned. The flow of intake air into intake manifold 302 may be controlled by throttle 312, the position of which may be controlled by controller 110.

In the embodiment depicted in FIG. 3, the engine 104 is a V-12 engine having twelve cylinders. In other examples, the engine may be a V-6, V-8, V-10, V-16, I-4, I-6, I-8, opposed 4, or another engine type. Due to the vee configuration of the engine, the engine includes a first cylinder bank having six cylinders (e.g., cylinders 1-6) and a second cylinder bank having six cylinders (e.g., cylinders 7-12). Intake manifold 302 is arranged between the two cylinder banks and is configured to supply intake air to each cylinder of each bank via a plurality of intake runners. While not shown in FIG. 3, each intake runner is coupled to a separate cylinder head that at least partially defines a cylinder. Thus, intake air that flows through the intake manifold is distributed to a plurality of intake runners, each fluidically coupled to a separate cylinder head of the engine.

Intake manifold 302 is configured to supply intake air to the cylinders of the engine, as described above. However, intake manifold 302 includes further passageways for draining coolant from the engine and delivering gaseous fuel to the engine. As such, intake manifold 302 includes a first passage 304 configured to flow intake air. First passage 304 is coupled to the plurality of intake runners. First passage 304 receives intake air from intake passage 114.

To drain coolant from the engine, intake manifold 302 includes a second passage 306. Second passage 306 receives coolant that is directed out of each cylinder head, for example, and the second passage directs the coolant back to the general engine coolant system 318. The engine coolant system 318 may include one or more coolant components, such as a radiator (e.g., radiator 152 of FIG. 1), coolant tank (e.g., tank 156), cooling lines, pumps and/or other components. Thus, coolant from the engine coolant system is pumped to the engine 104, where it flows through one or more jackets of the cylinder block and/or cylinder head (e.g., coolant sleeve 228) to cool the engine. The coolant then drains out of the engine via drainage lines leading out from each cylinder head to the second passage 306, and the coolant is returned to the engine coolant system.

In some modes of operation, engine 104 may operate with both liquid fuel combustion (e.g., diesel fuel) and gaseous fuel (e.g., natural gas) combustion. While diesel fuel is delivered to each cylinder according to the configuration described above with respect to FIG. 2, gaseous fuel may be delivered to one or more cylinders via a third passage 308 of the intake manifold 302. As shown in FIG. 3, the third passage 308 of the intake manifold 302 may receive a supply of gaseous fuel from a gaseous fuel tank 316, via one or more gaseous fuel lines, pumps, pressure regulators, etc. In some embodiments, gaseous fuel tank 316 may be located remotely from engine 104, such as on a different rail car (e.g., on a fuel tender car), and the gaseous fuel may be supplied to the engine 104 via one or more fuel lines that traverse the separate cars. However, in other embodiments gaseous fuel tank 316 may be located on the same rail car as engine 104. The third passage 308 may include a plurality of gas admission valves (illustrated in FIG. 4 and described in more detail below), each configured to supply gaseous fuel from the third passage 308 to a respective cylinder head.

In some examples, each cylinder of the plurality of cylinders of the engine may be configured to receive gaseous fuel. As such, each cylinder head may be configured to receive gaseous fuel from the third passage via a respective gas admission valve and gas runner (described in more detail below). However, in other examples, only a subset of cylinders may be configured to receive gaseous fuel. For example, only half the cylinders may receive gaseous fuel. In such examples, a subset of the cylinder heads may include gas runners while the remaining cylinders do not include gas runners. Likewise, the intake manifold may be configured such that fewer gas admission valves are present than cylinder heads, in order to provide gaseous fuel to only a subset of the cylinders.

Exhaust gas resulting from combustion in the engine 104 is supplied to an exhaust passage 116, where the exhaust is treated by aftertreatment device 314 and/or flows through one or more turbochargers before exiting to atmosphere. In the configuration illustrated in FIG. 3, each cylinder bank has an exhaust manifold. For example, exhaust manifolds 310a and 310b are illustrated in FIG. 3. Each exhaust manifold receives exhaust released from each cylinder of a respective cylinder bank (via an exhaust runner of the respective cylinder head, such as exhaust runner 212 of FIG. 2). Each exhaust manifold 310a, 310b directs exhaust to the common exhaust passage 116.

Figure 4:
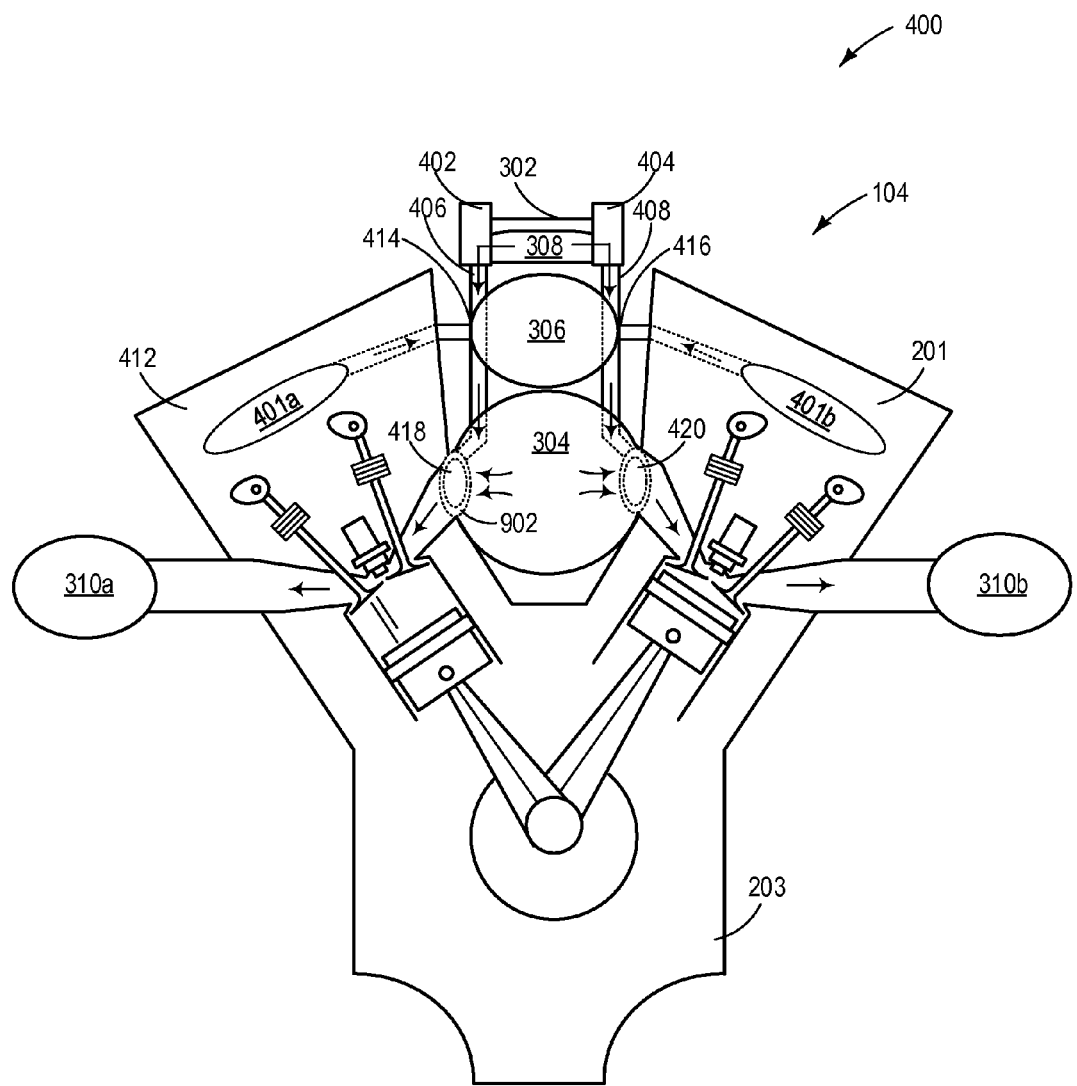
Figure 5:
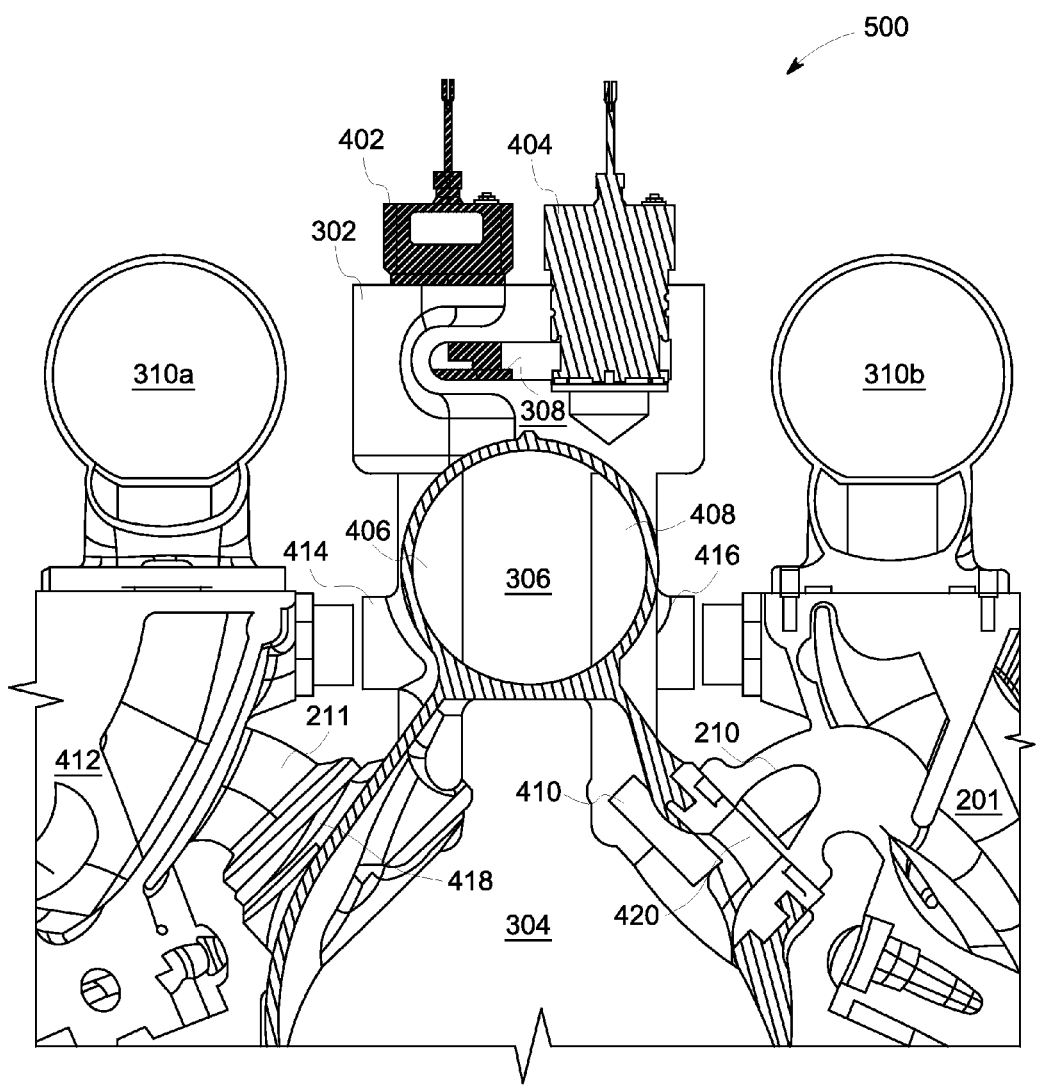
FIGS. 5-10 illustrate various views of an intake manifold according to embodiments of the invention.
Figure 6:
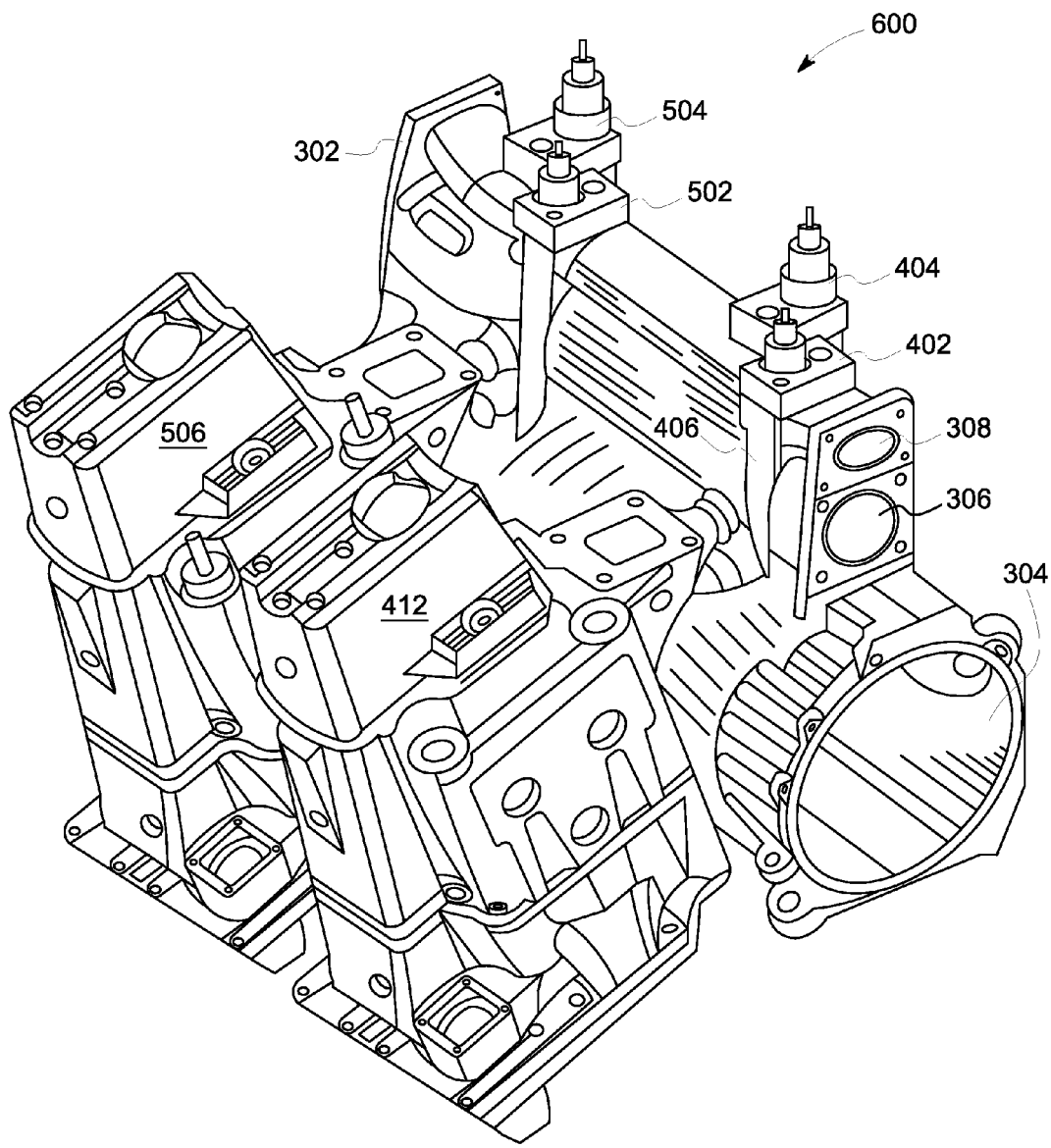
Figure 7A:
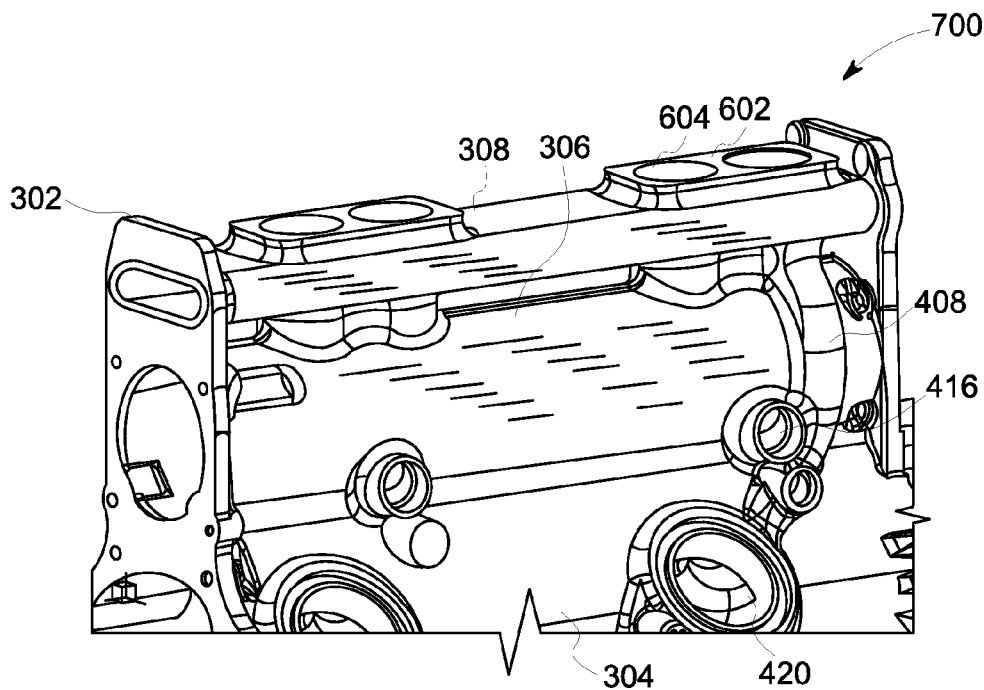
Figure 7B:
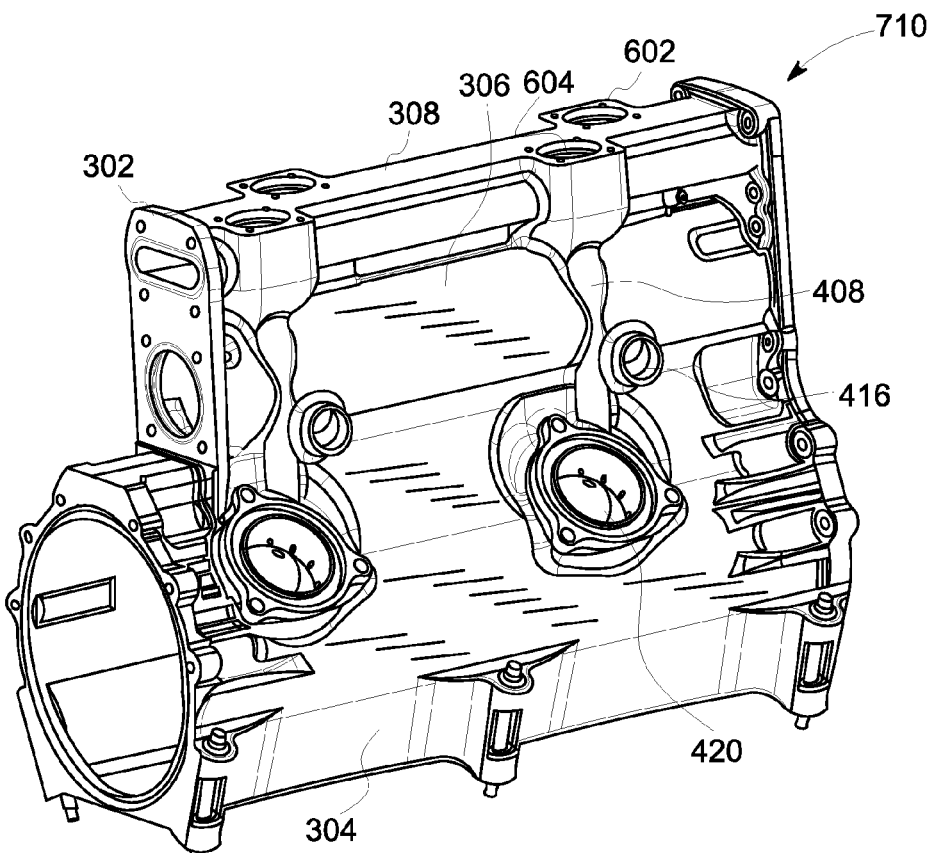
Figure 8:
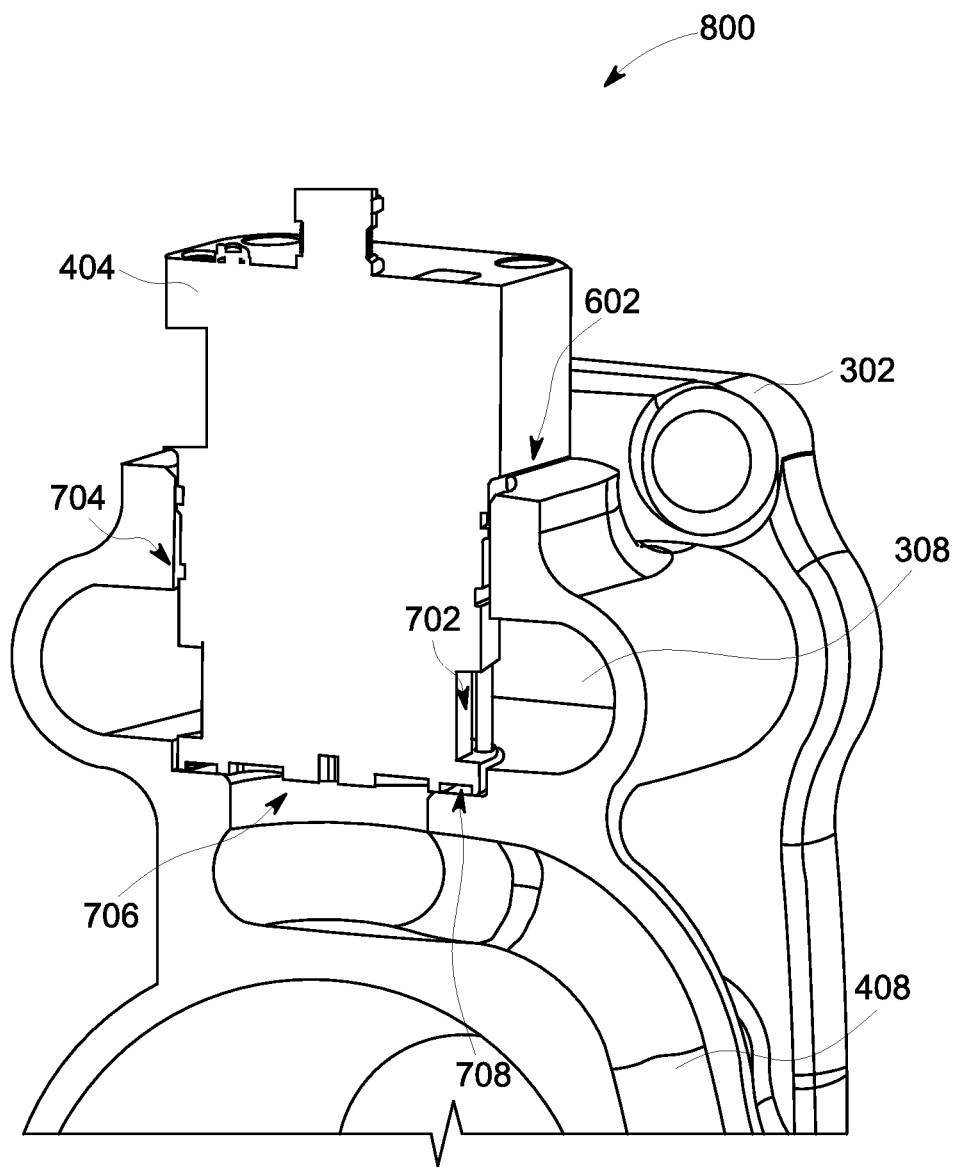
Figure 9A:
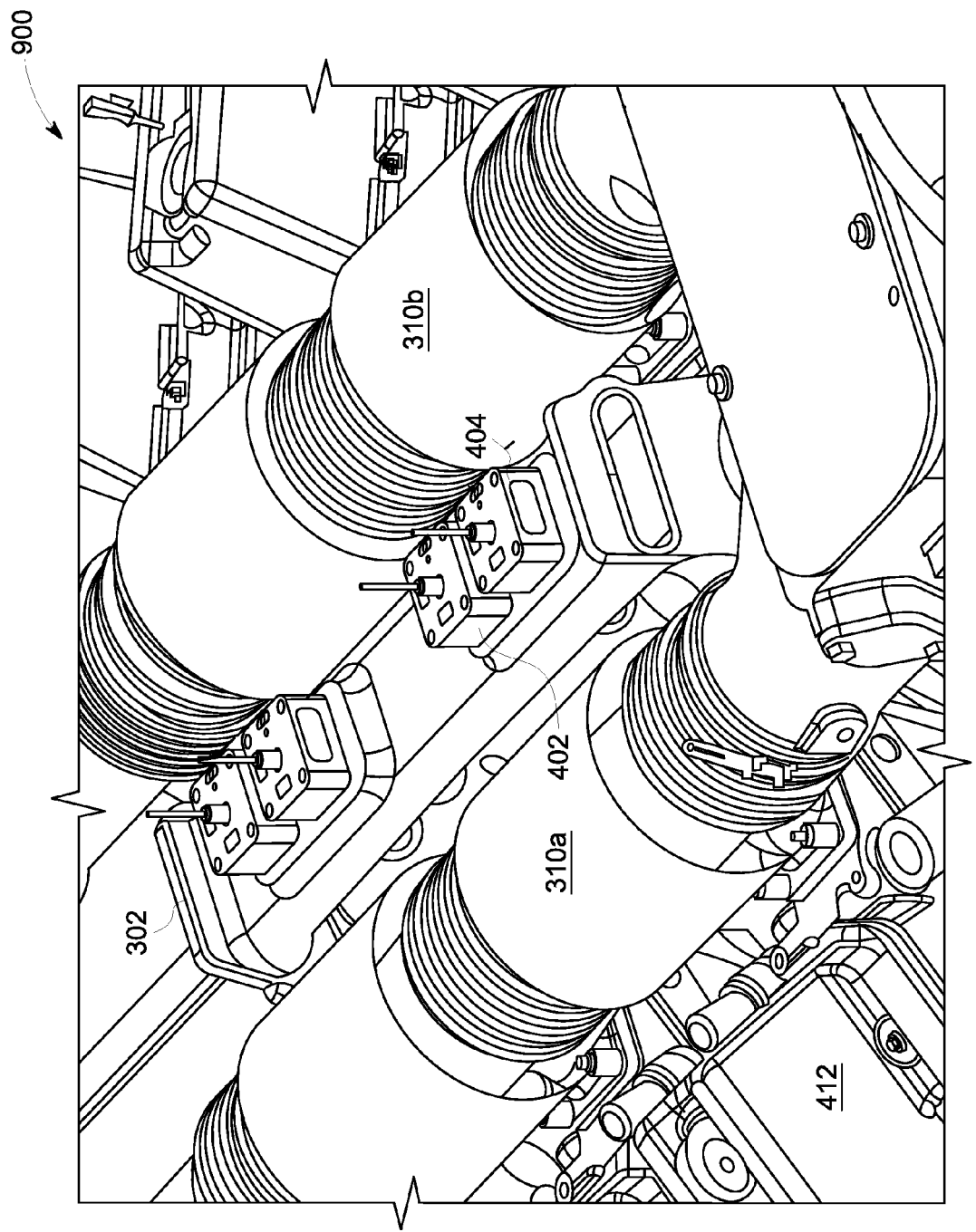
Figure 9B:
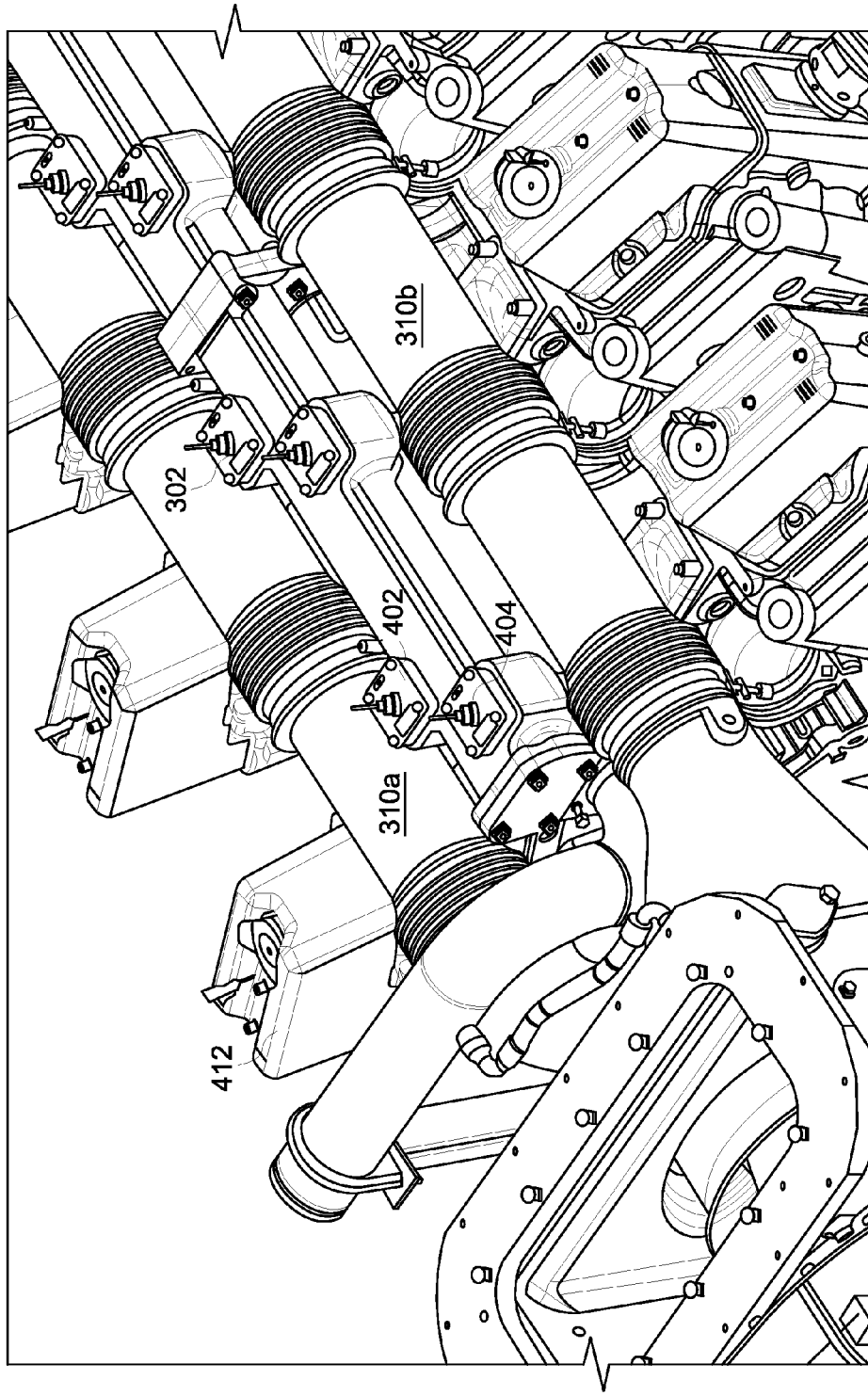
Figure 10:
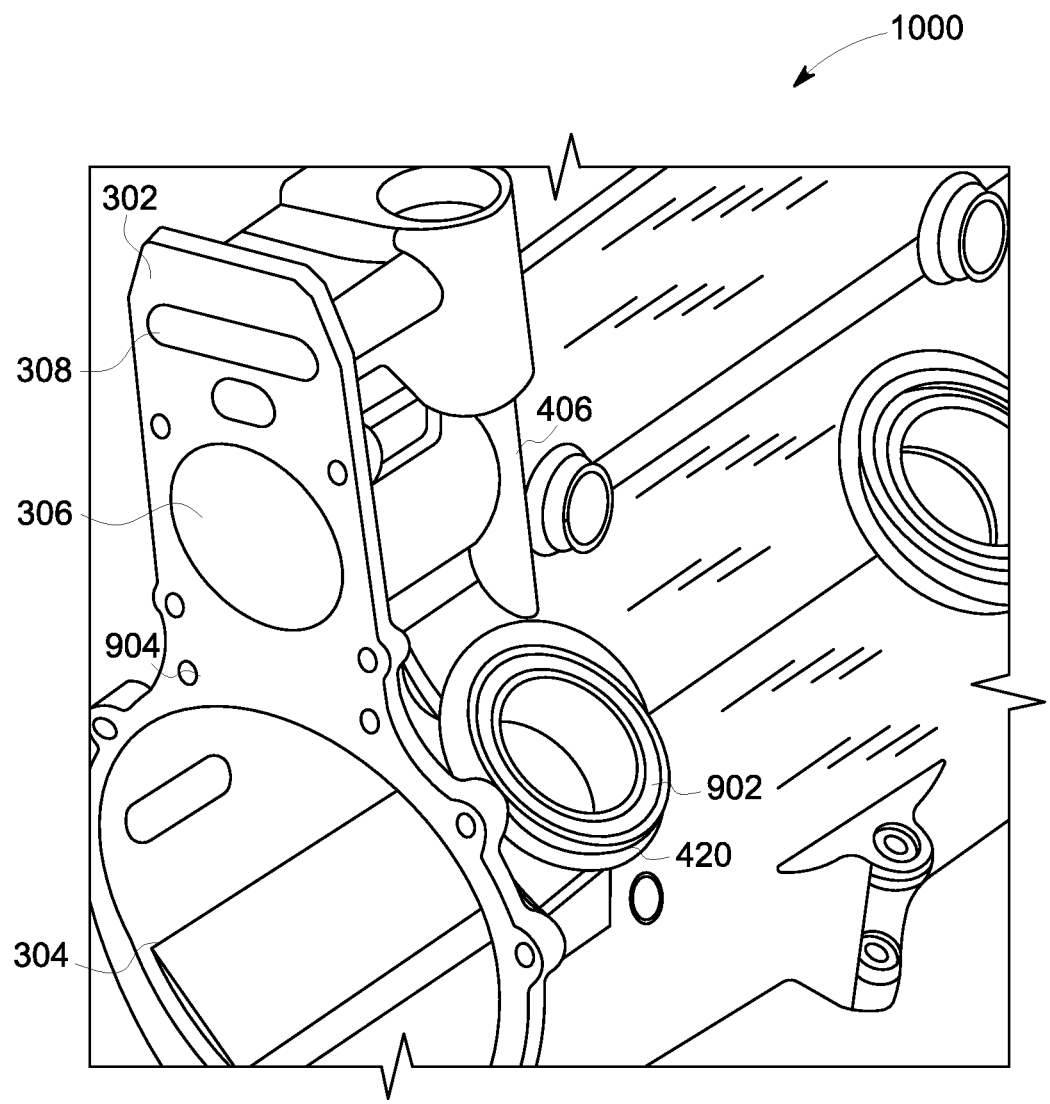

As mentioned above, in embodiments, the intake manifold 302 includes three passages for the flow of three separate fluids, intake air, coolant, and gaseous fuel. FIGS. 4-10 illustrate various views of the intake manifold 302, alone or in combination with various features of the engine and/or vehicle system. Specifically, FIG. 4 is a schematic cross-sectional view 400 of the intake manifold and two cylinder heads, including internal components, coupled to a cylinder block. FIG. 5 illustrates a cross-sectional view 500 of the intake manifold coupled to two cylinder heads, FIG. 6 illustrates an oblique perspective view 600 of the intake manifold coupled to two cylinder heads, FIGS. 7A and 7B illustrate isometric views 700, 710 of the intake manifold according to various embodiments, FIG. 8 illustrates a cross-sectional view 800 of the intake manifold, FIGS. 9A and 9B illustrate top perspective views 900, 910 of the intake manifold as installed in a vehicle system, and FIG. 10 illustrates a side perspective view 1000 of the intake manifold. FIGS. 5-10 are drawn approximately to scale.

It is to be understood that in some examples, for purpose of clarity, the intake manifold and engine is described below as having each cylinder configured for receiving gaseous fuel, but that other configurations are possible. For example, only a subset (e.g., half, one third, one-fourth, three-fourths, etc.) of the cylinders may be configured to receive gaseous fuel. When a cylinder is not configured to receive gaseous fuel, certain componentry may be dispensed with for that cylinder, such as a gas admission valve, gas runner, and intake air port insert (described in more detail below).

Referring first to the cross-section views 400 of FIG. 4 and 500 of FIG. 5, intake manifold 302 includes a first passage 304, second passage 306, and third passage 308. Each of the passages is a hollow passageway configured to flow a different fluid to or from the engine through the intake manifold. First passage 304 is an intake air passage configured to flow intake air, second passage 306 is a coolant passage configured to flow coolant (e.g., water), and third passage 308 is a gas passage configure to flow gaseous fuel (e.g., natural gas). First passage 304 has a first volume, second passage 306 has a second volume, and third passage 308 has a third volume. As illustrated, the first volume of first passage is larger than the second volume and third volume, while the second volume is larger than the third volume. The first volume is an entirety of an interior of the first passage, the second volume is an entirety of an interior of the second passage, and the third volume is an entirety of an interior of the third passage. The cross-sectional area of the first passage 304 is larger than the cross-sectional area of the second passage 306, and the cross-sectional area of the second passage 306 is larger than the cross-sectional area of the third passage 308. However, other configurations are possible, such as the third volume of the third passage being larger than the second volume of the second passage. In one aspect, the passages 304, 306, 308 are not fluidly connected to one another, such that fluids in the passages do not co-mingle.

When the intake manifold is installed, the first passage 304 is positioned in the intake manifold 302 in a vertically-lowest position. That is, second passage 306 and third passage 308 are each positioned above the first passage 304. Third passage 308 is vertically above second passage 306 and first passage 304, and second passage 306 is intermediate between first passage 304 and third passage 308. Further, the intake manifold may include a central axis that runs from the top of the third passage to the bottom of the first passage, and each passage may be vertically aligned along the central axis. While the present disclosure illustrates the three passages with the relative positioning described above, other positions are within the scope of this disclosure. For example, in some embodiments the third passage that flows gaseous fuel may be located intermediate between the first, intake air passage and the second, coolant passage, or the third passage that flows gaseous fuel may be located beneath the first, intake air passage. In other embodiments, the second, coolant passage may be dispensed with, that is, the intake manifold includes only the passage for intake air and the passage for gaseous fuel, and not a passage for coolant. In still further embodiments, more than one coolant, gaseous, and/or intake air passage may be present in the intake manifold.

Intake manifold 302 is positioned between two cylinder banks. Each cylinder bank includes a plurality of separate cylinder heads coupled to a cylinder block. Thus, for each cylinder of the engine, a separate cylinder head is provided. FIGS. 4 and 5 illustrate two cylinder heads, cylinder head 201 (as shown in FIG. 2) and cylinder head 412. Each cylinder head houses the various engine components described in FIG. 2, including intake and exhaust valves, liquid fuel injector, etc. Further, cylinder head 201 is included as part of a first cylinder bank while cylinder head 412 is included as part of a second, different cylinder bank. Both cylinder head 201 and cylinder head 412 are coupled to the same cylinder block 203.

As shown in FIG. 5, each cylinder head receives intake air for combusting in its cylinder via an intake runner fluidically coupling the first passage 304 of the intake manifold 302 to the cylinder head. For example, intake runner 210 couples first passage 304 to cylinder head 201, while intake runner 211 couples first passage 304 to cylinder head 412.

In order to supply gaseous fuel to the cylinders, one or more gas admission valves are mounted on the intake manifold. As shown, a first gas admission valve 402 and second gas admission valve 404 are shown mounted to third passage 308. In the cross-sectional view 500 illustrated in FIG. 5, a cross-section of gas admission valve 404 is shown, while a front perspective view of gas admission valve 402 is shown, as the two gas admission valves are offset from each other (shown in more detail in FIG. 6). Each gas admission valve includes a solenoid or other actuator to open the valve. To regulate the amount (e.g., volume, flow rate, etc.) of gaseous fuel that flows from the third passage 308 to a respective cylinder, the duration the valve is open may be adjusted.

The gaseous fuel is directed from the third passage 308 to the cylinder heads through a plurality of gas runners. FIGS. 4 and 5 illustrate two gas runners, gas runner 406 and gas runner 408. Gas runner 406 fluidically couples gas admission valve 402 to cylinder head 412. Gas runner 408 fluidically couples gas admission valve 404 to cylinder head 201. Each gas runner of FIGS. 4-5 is a vertical runner that extends along the height of the intake manifold. Accordingly, the gas runners exit out of the third passage 308, pass outside or traverse through the second passage 306, and enter into the first passage 304. In the first passage 304, each gas runner is fluidically coupled to a respective cylinder head in order to supply the gaseous fuel to the cylinder head.

As such, the intake manifold includes plural gas runners corresponding to the number of cylinders, where there is a single gas runner corresponding to each cylinder, in one example. In other examples, the intake manifold includes gas runners corresponding to less than the number of cylinders.

For each given cylinder head, gas runner, and gas admission valve, the gaseous fuel exits the gas runner and mixes with incoming intake air at a mixing region where the intake manifold is coupled to the cylinder head. Specifically, each cylinder head may be coupled to the first passage 304 of the intake manifold 302 at an intake air port, such as intake air port 420 (where cylinder head 201 is coupled to intake manifold 302) and intake air port 418 (where cylinder head 412 is coupled to intake manifold 302). An open passageway (illustrated in the region of 410 of FIG. 5) may be tooled into the intake manifold 302 to provide a passage from the gas runner to the intake air port. At the mixing region, which may be the junction point where the intake air port and cylinder head join, the gaseous fuel is mixed with the intake air before the fuel-air mix is drawn into the cylinder head. As described in more detail below, each intake air port may include an insert 902 to aid in gaseous fuel circulation and air mixing. However, in some embodiments the intake manifold may be coupled to each cylinder head without the inclusion of the inserts.

Intake manifold 302 includes further couplings to the cylinder heads. For example, the second passage 306 is fluidically coupled to each cylinder head through a plurality of coolant ports, such as coolant port 414 and coolant port 416. Each coolant port may receive coolant from a respective cylinder head and direct the coolant to the second passage 306, where it is routed to the engine coolant system. For example, FIG. 4 shows that second passage 306 receives coolant from a first coolant jacket 401a and a second coolant jacket 401b, each housed in a respective cylinder head. Further still, each cylinder bank has a separate exhaust manifold (e.g., exhaust manifold 310a and exhaust manifold 310b).

Thus, FIGS. 4-5 illustrate that in embodiments, the intake manifold 302 is comprised of three passages integrated in a single manifold. Each passage may be cast out of a suitable material, such as steel, aluminum, and/or nickel. The intake manifold may be cast or otherwise formed as one integrated component, or one or more of the passages may be cast separately and coupled together. In one example, the first passage 304 and second passage 306 may be cast together, and the third passage 308 may be cast separately and coupled (e.g., welded) to the second passage 306.

As shown, the gas admission valves are sunk into the third passage 308 such that a portion of each valve is external to the intake manifold and a portion of each valve is housed inside the intake manifold. To house the gas admission valves, the third passage 308 may include one or more mounting flanges including one or more bores in which the gas admission valves are inserted. For example, FIGS. 7A-B show intake manifold 302 with the gas admission valves removed for clarity. A mounting flange 602 includes two bores 604, each of which is configured to house a gas admission valve.

The gas runners 406, 408 may traverse the second passage, as described above. As such, in some embodiments, the second passage may be constricted where the runners travel through the passage, constricting the flow of coolant through the second passage at the runners. However, in other embodiments, the runners may be positioned substantially outside of the second passage (e.g., housed within the outer wall of the second passage) such that coolant flow is not restricted. In some conditions, the coolant in the second passage may act to cool the gas runners and/or gas admission valves. However, because the coolant flowing through the second passage is exiting the engine, the coolant may be hot due to heat transfer from the engine, and may not substantially cool the gas admission valves. Because the gas admission valves are located proximate the exhaust manifolds, heat from the exhaust may transfer to the gas admission valves. To protect the valves, the solenoid of each valve may be sunk into the third passage 308. Additionally, the flow of gas through the gas admission valves may act to cool the valves, further protecting the solenoids.

The first passage 304 and second passage 306 may each have a substantially circular cross-section, while the third passage 308 may have an oblong or oval cross-section. However, other cross-sectional shapes are possible, such as rectangular. Further, each gas runner may be substantially vertical, or may be curved in places. Additionally, each gas runner may comprise a channel cast or machined in the intake manifold, although separate pipes or tubes are also possible. Alternatively or additionally, one or more of the first passage 304, second passage 306, third passage 308, gas runners, or intake runners may include a structures or devices for affecting the flow of the gaseous fuel and/or air through the respective passages. For example, one or more of the passages or runners may include mixer vanes, Venturi tubes, or other structure to increase or decrease flow velocity, create swirl, or other effect to increase mixing of the air and gaseous fuel, for example.

As explained above with respect to FIG. 3, the engine may be a twelve cylinder engine with two cylinder banks each having six cylinders. Each cylinder may be defined by a separate cylinder head, and each cylinder head may be coupled to the intake manifold at least two ports, an intake air port and a coolant port. The intake manifold may be manufactured as three separate sections, each configured to couple to four cylinder heads (two on each side of the intake manifold). Accordingly, as shown in FIG. 6, each section of the intake manifold may include four gas admission valves, such as gas admission valves 402, 404, 502, and 504. Each side of each section of the intake manifold may be coupled to two cylinder heads, such as cylinder heads 412 and 506 as shown in FIG. 5. Each section of the intake manifold may be coupled to another, similarly configured section of intake manifold and/or to an end piece. Thus, in a fully installed V-12 engine, three intake manifold sections may be coupled together such that six cylinder heads are coupled to each side of the intake manifold. To facilitate coupling of the intake manifold sections, each intake manifold section may include coupling flanges (such as coupling flange 904 of FIG. 10). The coupling flanges may facilitate coupling of two intake manifold sections, the coupling of an end piece to an intake manifold section, and/or the coupling of the intake passage, gaseous fuel delivery line, and/or coolant drainage line to the intake manifold. Various gaskets may be provided between the coupling flanges to seal the water-to-water, air-to-air, and gas-to-gas joints. The section of the intake manifold 302 illustrated in FIG. 6 includes four gas admission valves mounted to the third passage 308 in offset pairs. The mounting flange 602 (shown in FIGS. 7A-B and 8) accommodates two gas admission valves, one gas admission valve coupled to a first cylinder head on a first cylinder bank and the other gas admission valve coupled to a second cylinder head on a second cylinder bank. FIG. 6 further illustrates that in some embodiments, the first and second passages 304, 306 may be contiguous (e.g., no intervening space between the passages), while a gap may be present between the second passage 306 and the third passage 308. The mounting flange bores 604 may traverse the gap between the third passage 308 and second passage 306. Additionally, while the gas runners are illustrated in FIGS. 4 and 7B as substantially vertical, in FIG. 7A, gas runner 408 is embodied as curving around second passage 306.

FIG. 8 illustrates further details of the coupling between the gas admission valves and the intake manifold. FIG. 8 shows a cross-section through gas admission valve 404, for example. As described above, mounting flange 602 provides a direct mount for the gas admission valve. An inlet 702 of the gas admission valve receives gaseous fuel flowing through the third passage 308. A seal 704 seals the inlet of the gas admission valve. Further, an outlet 706 of the gas admission valve is configured to release gaseous fuel to the gas runner 408. A seal 708 seals the outlet of the gas admission valve.

Thus, the gaseous fuel passage (third passage 308) may be a cast passage integrated into the intake manifold. The gas admission valves may be dropped in to the passage via mounting flanges having bores. Gas runners may be cast between the gas admission valve outlet and mixing region at the intake air port between the intake manifold and cylinder head. The runners may be vertical (e.g., straight), curved, or have a different geometry.

The gas passage and gas admission valves may supply gaseous fuel to the engine at 1-2 bar above manifold pressure (MAP) to achieve up to 100% diesel energy equivalent gas substitution in some examples. Gas admission to each cylinder may be individual, that is, each gas admission valve may be independently controlled such that each cylinder may receive different amounts of gaseous fuel, if desired. The configuration described above, with the third, gaseous fuel passage mounted on the air and coolant passages, allows for an engine originally configured for diesel-only operation to be retrofitted for multi-fuel operation with minimal modifications to the engine.

By providing an intake manifold that includes a gaseous fuel passage such that the gaseous fuel is admitted to the cylinders via the intake manifold, gas admission valve vibration may be reduced over other configurations (such as when the gas admission valves are mounted on the cylinder heads directly). Further, fewer gas sealing joints are present. Additionally, no major cylinder head modifications are required, and there is little or no serviceability impact on existing engine components.

The above-described embodiments were presented with respect to a V-12 engine having two cylinder banks. However, the intake manifold of the present disclosure may be used in other engine configurations, such as V-6, V-18, inline engines, or other configurations. In inline engines, where a single cylinder bank is present, the intake manifold may be coupled to each cylinder head along one side of the intake manifold (rather than both sides as in the two-bank configuration described above). In such inline engine configurations, the intake manifold may have intake air runners, coolant ports, and/or gas admission valves positioned along only one side of the intake manifold. Further, while the intake manifold is previously described as including four gas admission valves and respective gas runners per section of the intake manifold, other configurations are possible, such as single-section intake manifold having all the gas admission valves and gas runners for all the cylinders of the engine or a multiple-section intake manifold where each section has one, two, three, four, five, or other number of gas admission valves and gas runners. In still further examples, the number of gas admission valves and corresponding gas runners may be less than the number of cylinders. As such, in one example, only one side of the intake manifold may include gas admission valves and gas runners to deliver gaseous fuel to only one bank of cylinders. In another example, one or more sections of the intake manifold may include fewer gas admission valves and gas runners than cylinders, such as one section including no gas admission valves and no gas runners while the other sections include at least some gas admission valves and gas runners. Thus, the count of manifold sections, gas admissions valves per manifold section, etc., is specific to a particular engine's architecture. In other engine applications (V8, V16, inlines, etc.) the intake manifold could have any number of manifold sections and valve count combinations.

As explained previously, the gaseous fuel and intake air may mix at the intake air port where the intake air passage (e.g., first passage 304) is coupled to a cylinder head. To promote efficient mixing of the intake air and gaseous fuel, each intake air port may be provided with an insert. FIG. 10 shows an embodiment of the intake manifold 302 including an insert 902 in the intake air port 420. The insert may be annular and include a plurality of grooves to facilitate mounting of the cylinder head, sealing of the joint between the intake manifold and cylinder head, and gas circulation.

Figure 11A:
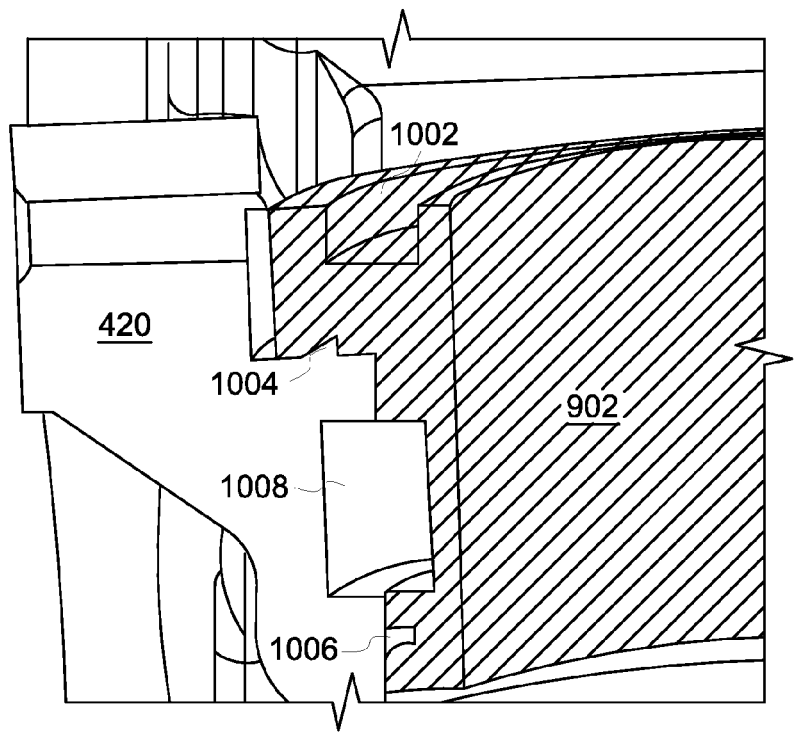
FIGS. 11A-12D illustrate various views and embodiments of an intake air port and insert of an intake manifold according to the invention.

FIGS. 11A-12D and 14 illustrate various views and embodiments of the insert and intake air port housing the insert. FIG. 11A shows a cross-sectional view of the insert housed in the intake air port. FIGS. 11B and 11C show isolated views of the intake air port. FIGS. 11D-11E and 12A-12D show various embodiments of gas openings in the cross-sectional view of the insert.

Insert 902 comprises an annular body having a top surface 905, bottom surface 907 opposite the top surface, inner surface 909, and outer surface 911 opposite the inner surface. When the insert is mounted at a coupling location between the cylinder head and intake manifold, the top surface is oriented to face towards a cylinder head mounting region (e.g. to face towards the cylinder head) and the outer surface is oriented to be in face-sharing contact with the intake air port of the intake manifold.

The insert 902 includes a first groove 1002 in an outer circumference of the insert facing towards the cylinder head mounting region (e.g., the first groove is located on the top surface of the annular body). The first groove facilitates a tight connection with the cylinder head. Two additional grooves, 1004 and 1006, are present to house seals, such as o-rings, labyrinth seals, etc., which may be present solely on the insert to eliminate machining on the manifold casting, to seal the joint between the manifold and the cylinder head. A second groove 1008 facilitates gas circulation. The second groove is comprised of a groove present in the outer surface of the annular body of the insert as well as machined into the intake air port of the manifold. The gas released from the gas runner circulates through the second groove 1008 and is drawn into the intake air port to mix with the intake air via one or more openings (not shown in FIG. 11A).

Figure 11B:
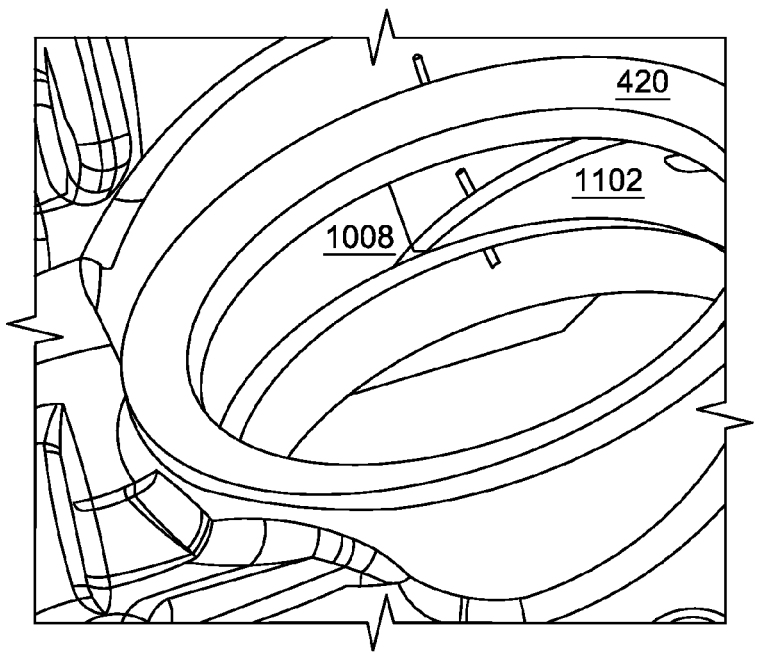
Figure 11C:
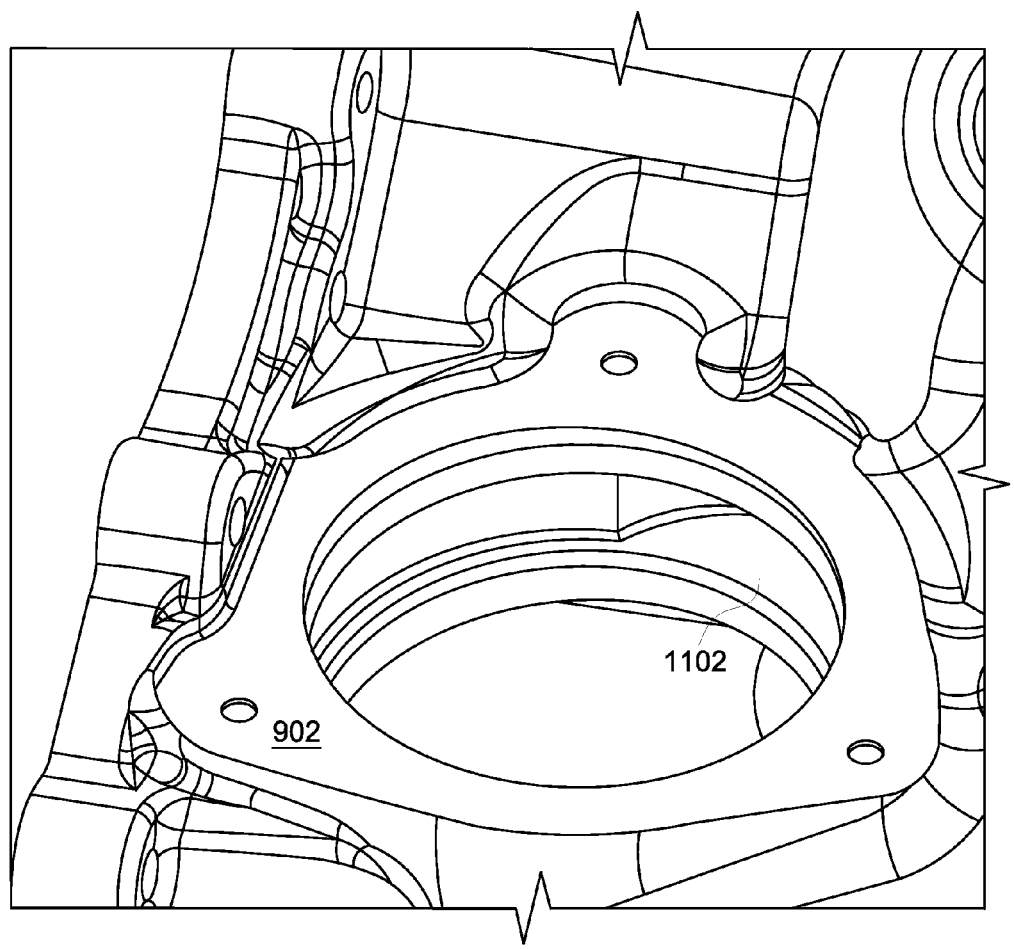

FIG. 11B illustrates the intake air port 420, with the insert removed. The portion of the groove 1008 provided by the manifold is illustrated, as well as the passageway 1102 leading from the gas runner to the groove 1008, through which the gas exits the runner and enters the intake air port.

Figure 11D:
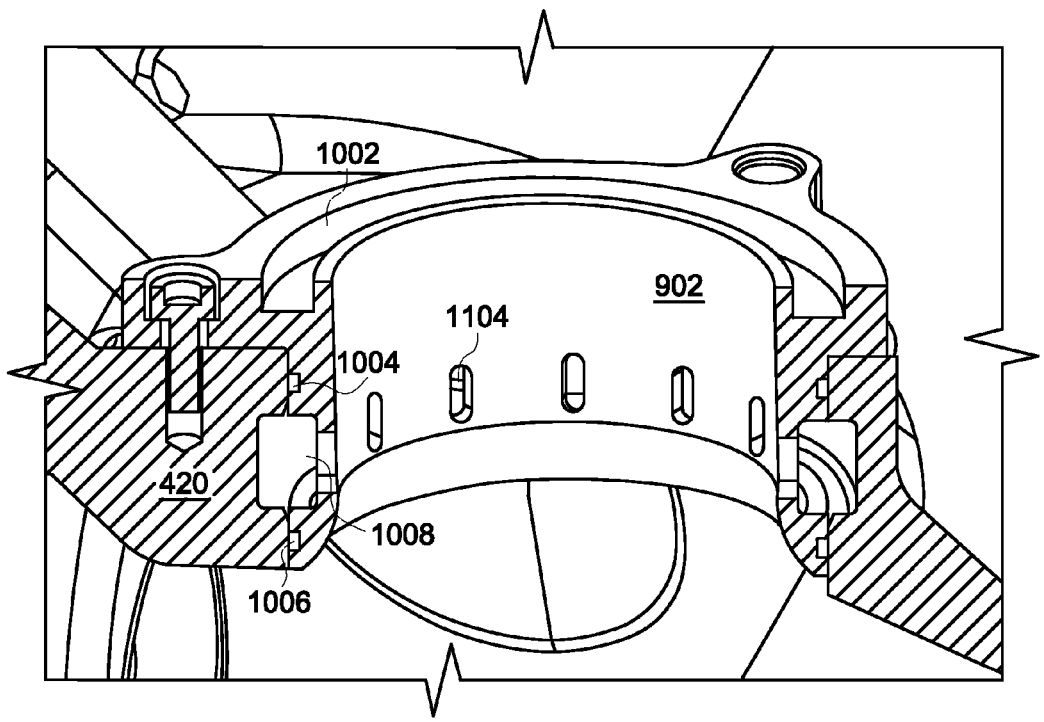
Figure 11E:
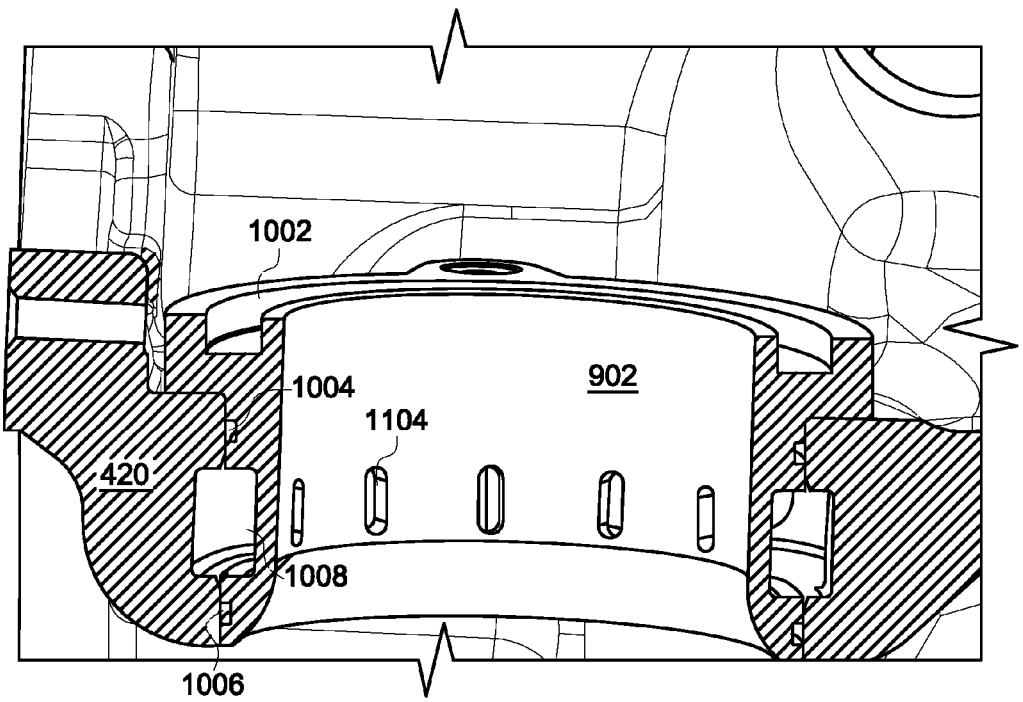
Figure 12A:
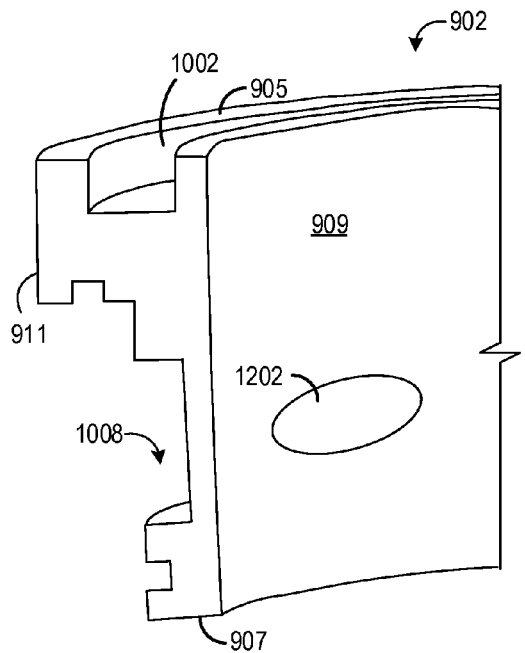

FIGS. 11D-11E and 12A-12D illustrate various embodiments for openings in the insert 902 that extend from the inner surface through the insert and to the outer surface, and through which the gaseous fuel can mix with the intake air in the intake air port. The openings may be defined by one or more surfaces defining one or more bores or protrusions. FIGS. 11D and 11E show a plurality openings, such as opening 1104. Opening 1104 may be oval shaped, a rounded rectangle, square, circular, or other configuration. The plurality of openings may be spaced equally apart along an inner circumference of the insert. FIG. 12A shows a single opening 1202, arranged in the center of the inner circumference of the insert where the passageway 1102 opens into the groove 1008. While the opening 1202 as illustrated is oval-shaped, other configurations are possible. For example, the opening could be circular, rectangular, be a continuous opening that is present around a portion or all of the circumference of the insert, or other configurations. Further, the one or more openings may extend through the insert with a smooth/straight surface profile, or the one or more openings may extend through the insert with a surface profile that expands, is fluted, tapered, rifled, induces swirl, or other configuration.

The cross-sectional and/or surface profile of the one or more openings (e.g., whether oval, circular, straight, tapered, etc.) may affect the flow velocity, dispersion angle, or other parameter of the entry of the gaseous fuel into the intake air port, and thus may be selected based on desired system performance. In one example, a circular opening may direct gaseous fuel toward the center of the intake air port, while an oval or rectangular opening may provide for a more even dispersion of the gaseous fuel.

Figure 12B:
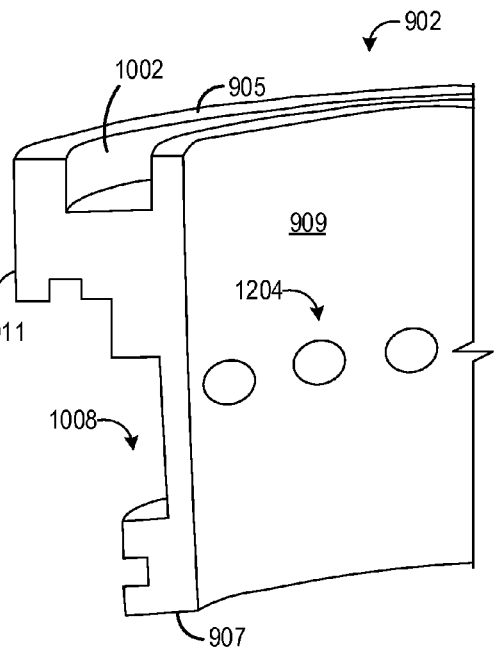
Figure 12C:
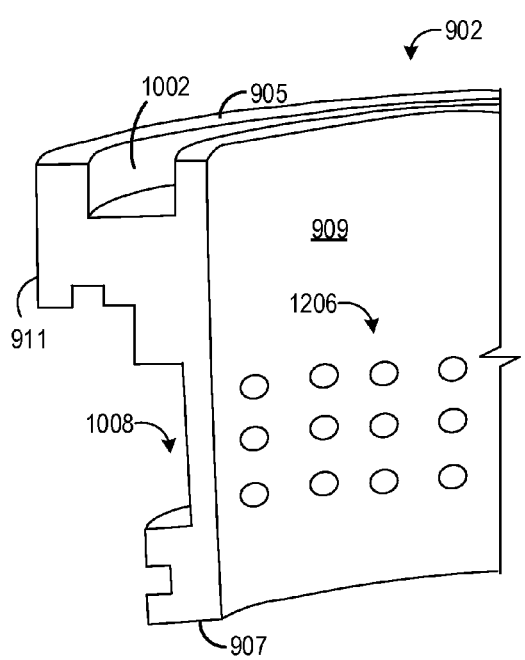
Figure 12D:
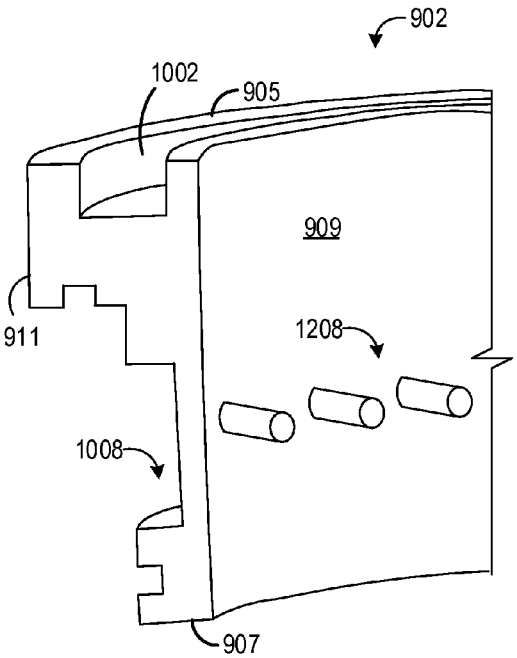

FIGS. 12B and 12C illustrate embodiments of insert 902 where multiple openings are present. FIG. 12B shows a first plurality of openings 1204, while FIG. 12C shows a second plurality of openings 1206. The first plurality of openings 1204 may be larger in size but fewer in number than the second plurality of openings 1206. For example, the first plurality of openings 1204 may be arranged in a single row around the inner circumference of the insert, while the second plurality of openings may be arranged in multiple rows. Further, as shown in FIG. 12D, one or more openings may be defined by surfaces that define one or more protrusions 1208, in order to direct the gas to the center of the intake air port.

Thus, the systems described herein provide for an intake manifold for an engine. In one embodiment, the intake manifold includes a first passage providing a first pathway through the intake manifold for supplying intake air to a plurality of cylinders of the engine, and a second passage providing a second pathway through the intake manifold for supplying gaseous fuel to at least one of the plurality of cylinders. The intake manifold further comprises at least one gas admission valve mounted to the second passage configured to control a flow rate of the gaseous fuel to the at least one of the plurality of cylinders.

The engine may comprise a plurality of cylinder heads, each cylinder head defining a respective cylinder of the plurality of cylinders. The intake manifold further comprises at least one gas runner coupling a respective one of the gas admission valves to a respective one of the cylinder heads, for the passage of the gaseous fuel from the second passage the plurality of cylinders. In some examples, each gas runner comprises a respective channel of the intake manifold. In examples, each gas runner comprises a vertical channel.

The first passage of the intake manifold may also include a plurality of intake air ports, each cylinder head coupled to a respective one of the intake air ports. The intake manifold may be configured to direct the intake air supplied to the plurality of cylinders through the plurality of intake air ports.

Each gas runner may comprise a first end coupled to the second passage and a second end fluidically coupled to a respective one of the intake air ports via a passageway. Each intake air port may further comprise a mixing region where the intake air and gaseous fuel mix before being directed to a respective cylinder head.

The intake manifold may further comprise a third passage providing a third pathway through the intake manifold for directing coolant from the engine to a cooling system component. In some examples, the first passage comprises a first volume, the second passage comprises a second volume, and the third passage comprises a third volume, where the first volume is larger than the second volume and the third volume is larger than the second volume. The first volume is an entirety of an interior space of the first passage, the second volume is an entirety of an interior space of the second passage, and the third volume is an entirety of an interior space of the third passage.

In examples, the first passage is arranged vertically below the second passage and the third passage, and the second passage is arranged vertically above the third passage. The first passage, second passage, and third passage may be integrated in the intake manifold, or each may be cast as separate parts and coupled (e.g., welded) together. In one embodiment, the intake manifold comprises at least a passage for intake air and a passage for gaseous fuel, which are cast or otherwise formed as one integrated component, or otherwise permanently coupled together via welding or the like. In another embodiment, the intake manifold further comprises a passage for coolant, which is cast or otherwise formed as one integrated component with the intake air and gaseous fuel passages, or otherwise permanently coupled together with the passages for intake air and gaseous fuel via welding or the like. In another embodiment, one or more of the intake air, gaseous fuel, and coolant passages are not permanently connected to others of the passages, but when installed in conjunction with an engine, the passages are located above the cylinder block of the engine, and vertically stacked/arrayed one atop the other. In another embodiment, the passages are permanently connected to one another, and when installed in conjunction with an engine, are located above the cylinder block and vertically stacked/arrayed one atop the other. In a still further embodiment, more than one intake air, gaseous fuel, and/or coolant passage may be present.

The intake manifold may be a first intake manifold having four gas admission valves and further comprising a first coupling flange on a first end of the first intake manifold and a second coupling flange on a second end of the first intake manifold, the first and second coupling flanges each configured to couple to a coupling flange of an additional intake manifold or to an end piece.

In some examples, the engine is a multi-cylinder engine having a first bank of cylinders and a second bank of cylinders, and the first intake manifold is configured to be disposed between the first and second banks. Half the gas admission valves are configured to supply gaseous fuel to respective cylinders of the first bank and the other half of the gas admission valves are configured to supply gaseous fuel to respective cylinders of the second bank.

An intake manifold for an engine according to another embodiment comprises a first passage for supplying intake air to a plurality of cylinders of the engine; a second passage for directing coolant from the engine to a cooling system component; and a third passage for supplying gaseous fuel to the plurality of cylinders.

The engine comprises a plurality of cylinder heads, each cylinder head defining a respective cylinder of the plurality of cylinders, and the intake manifold further comprises a plurality of gas admission valves mounted to the third passage for regulating admission of the gaseous fuel to the plurality of cylinders, the gas admission valves respectively fluidically coupled to the cylinder heads by plural gas runners, wherein the intake manifold is configured for gaseous fuel from the third passage to flow through the gas runners to reach the plurality of cylinders. In some examples, each gas runner comprises a respective, vertical channel traversing through the second passage.

An embodiment for an engine system comprises an engine having a plurality of cylinders, each cylinder defined by a respective cylinder head; and an intake manifold to supply intake air to the engine via a first passage, direct coolant out of the engine via a second passage, and supply gaseous fuel to the engine via a third passage. Each cylinder of the engine comprises a fuel injector configured to inject liquid fuel for combustion.

The intake manifold further comprises at least one gas admission valve coupled to the third passage for controlling the supply of gaseous fuel to the engine. The engine system further comprises a control system configured to control each fuel injector during engine operation, and is further configured to control the plurality of gas admission valves to supply gaseous fuel to the engine during a multi-fuel operating mode.

The intake manifold further comprises a plurality of gas runners, wherein each gas admission valve is fluidically coupled to a respective cylinder head via a respective one of the gas runners. The first passage of the intake manifold further comprises a plurality of intake air ports, each cylinder head coupled to a respective one of the intake air ports, and wherein the intake manifold is configured for gaseous fuel from the gas runners to mix with intake air at the intake air ports before being directed to respective cylinder heads.

Each intake air port may further comprise a respective insert, each insert comprising a first groove for coupling the intake air port to a respective cylinder head and a second groove for circulating gaseous fuel from a respective one of the gas runners. The insert may further comprise one or more openings to fluidically couple the second groove to an interior of the intake air port. The one or more openings may comprise one or more circular bores and/or protrusions arranged annularly around an inner circumference of the insert.

An embodiment relates to a vehicle. The vehicle includes a multi-fuel engine configured to combust a first, liquid fuel and a second, gaseous fuel. The multi-fuel engine comprises a first cylinder bank having at least a first cylinder head and a second cylinder head coupled to a cylinder block, and a second cylinder bank having at least a third cylinder head and a fourth cylinder head coupled to the cylinder block. Each cylinder of the first and second cylinder banks comprises a respective fuel injector for injecting the liquid fuel.

The vehicle further includes an intake manifold arranged between the first cylinder bank and the second cylinder bank. The intake manifold comprises a first passage for supplying intake air to each cylinder head of the first cylinder bank and the second cylinder bank, a second passage for directing coolant from each cylinder head of the first cylinder bank and the second cylinder bank to a cooling system component, and a third passage for supplying the gaseous fuel to each cylinder head of the first cylinder bank and the second cylinder bank. A plurality of gas admission valves is mounted to the third passage for regulating admission of the gaseous fuel to the cylinder heads.

The vehicle further includes a first fuel tank for storing the liquid fuel and fluidically coupled to each fuel injector, and a second fuel source for the gaseous fuel and fluidically coupled to the third passage of the intake manifold. In some examples, the liquid fuel is diesel and the gaseous fuel is natural gas. The second fuel source may a gaseous fuel passage fluidically coupling a gaseous fuel tank to the gas admission valves, where the gaseous fuel tank is stored remotely from the vehicle (e.g., on a tender).

The vehicle may further comprise a first exhaust manifold coupled to the first cylinder bank and a second exhaust manifold coupled to the second cylinder bank. In examples, the vehicle is a rail vehicle. In examples, the rail vehicle is a locomotive.

In an example, an insert comprises an annular body having a top surface, bottom surface, inner surface, and outer surface; a first groove for coupling an intake air port of an intake manifold to a cylinder head; a second groove for circulating gaseous fuel received from a gas runner of the intake manifold; and one or more openings to fluidically couple the second groove to an interior of the intake air port, whereby the insert is configured to mix gaseous fuel and intake air at a coupling location between the intake manifold and the cylinder head.

The first groove is defined by the top surface of the annular body and is oriented to face towards a cylinder head mounting region when the insert is positioned at the coupling location between the intake manifold and cylinder head. The second groove is defined by the outer surface of annular body, the outer surface is oriented to be in face-sharing contact with the intake air port when the insert is positioned at the coupling location between the intake manifold and cylinder head.

The insert further comprises one or more additional grooves configured to house a seal, the one or more additional grooves defined by the outer surface. The one or more openings may define one or more bores arranged annularly around an inner circumference of the insert. The one or more bores may be oval, circular, rectangular, and/or square shaped. One or more surfaces respectively defining the one or more openings may define one or more protrusions arranged annularly around an inner circumference of the insert. The one or more openings extend from the inner surface through the insert to the outer surface.

An embodiment for an engine system comprises an engine having at least one cylinder, the at least one cylinder disposed within a respective cylinder head; an intake manifold configured to supply intake air to the engine via a first passage, to direct coolant out of the engine via a second passage, and to supply gaseous fuel to the engine via a third passage; and an insert positioned at a coupling location between the intake manifold and the cylinder head.

The engine system further comprises a fuel injector configured to inject liquid fuel for combustion into the at least one cylinder. The engine system further comprises at least one gas admission valve coupled to the third passage and configured to control the supply of gaseous fuel to the engine. The engine system further comprises a control system configured to control at least the fuel injector during engine operation and to control the at least one gas admission valve to supply gaseous fuel to the engine during a multi-fuel mode.

The intake manifold further comprises a gas runner, and the gas admission valve is fluidically coupled to the cylinder head via the gas runner. The first passage of the intake manifold further comprises an intake air port, the cylinder head coupled to the intake air port, and the intake manifold is configured for gaseous fuel from the gas runner to mix with intake air at the intake air port before being directed to the cylinder head.

The intake air port further comprises an insert comprising a first groove for coupling the intake air port to the cylinder head, a second groove for circulating gaseous fuel from the gas runner, and one or more openings to fluidically couple the second groove to an interior of the intake air port. One or more surfaces defining the one or more openings may define one or more bores and/or protrusions arranged annularly around an inner circumference of the insert.

Figure 13:
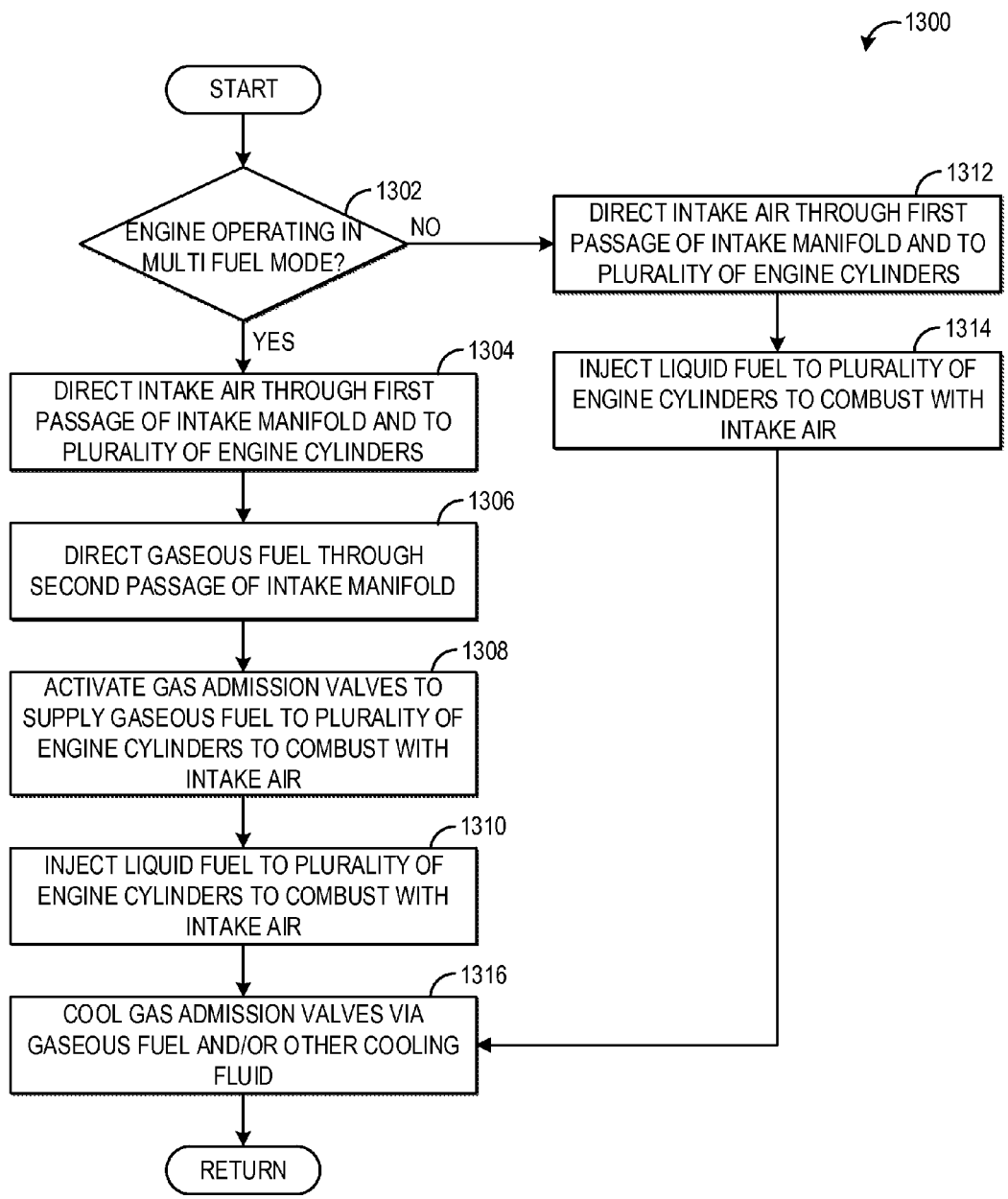
FIG. 13 is a flow diagram illustrating a method for a dual fuel engine according to an embodiment of the invention.
Figure 14:
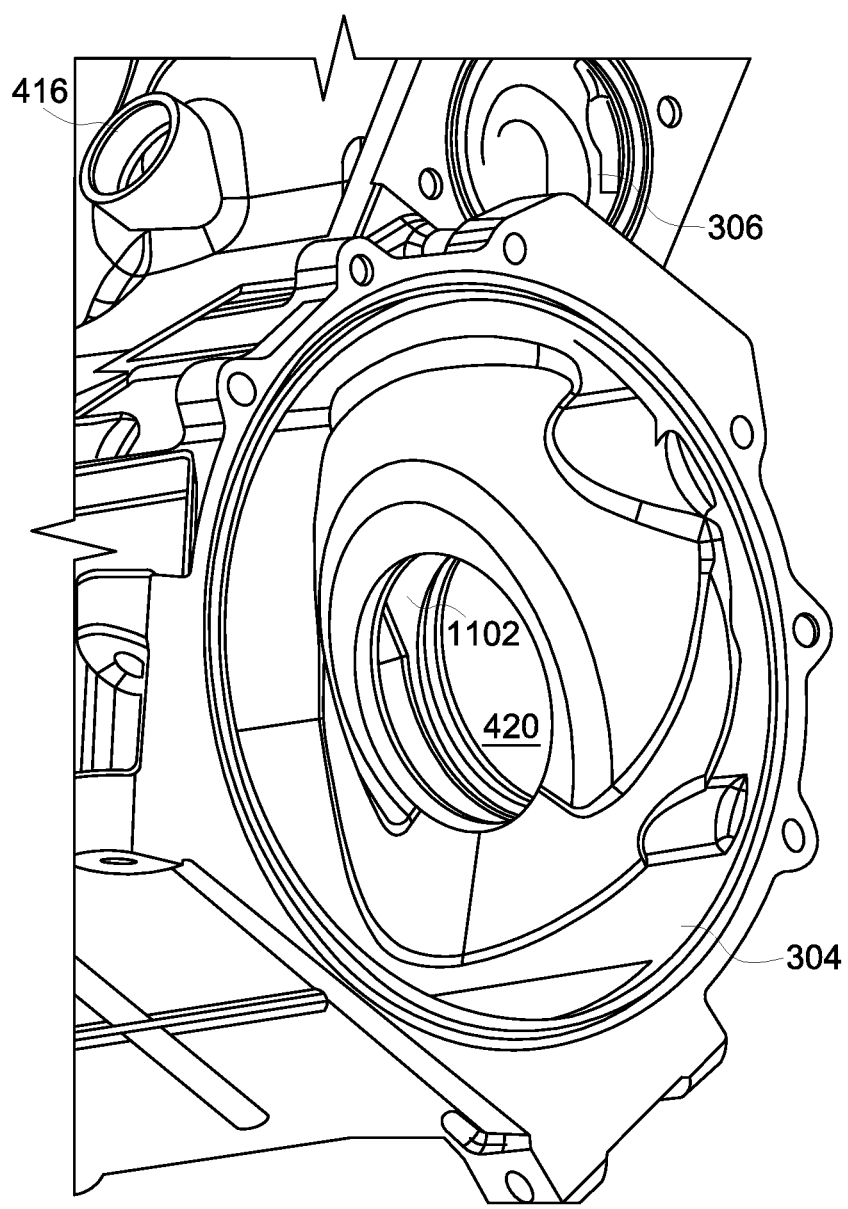
FIG. 14 illustrates a back view of an intake air port in an intake manifold according to an embodiment.

FIG. 13 is a method 1300 for a multi-fuel engine, such as the engine 104 described herein. Method 1300 may be carried out at least partially according to non-transitory instructions stored in a control system, such as a control system that includes controller 110. At 1302, method 1300 includes determining if the engine is operating under a multi-fuel mode. During the multi-fuel mode, both liquid fuel and gaseous fuel are provided to the engine. The multi-fuel mode may be carried out based on environmental conditions, various engine parameters, and/or end user input/preference. If the engine is not operating with multi-fuel mode, method 1300 proceeds to operate with a liquid-fuel only mode, which will be described below at 1312. If the engine is operating with multi-fuel mode, method 1300 proceeds to 1304 to direct intake air through a first passage of intake manifold and to a plurality of engine cylinders. At 1306, method 1300 includes directing gaseous fuel through a second, different passage of the intake manifold. At 1308, the gas admission valves are activated to supply the gaseous fuel to the plurality of engine cylinders, wherein the gaseous fuel combines with the intake air (at the intake air ports of the cylinder head/intake manifold junctures, for example) to form a gaseous fuel-air mixture. At 1310, liquid fuel is injected to the plurality of engine cylinders, where it combusts with the intake air and ignites the gaseous fuel.

Returning to 1302, if the engine is operating with liquid-fuel only, at 1312, the intake air is directed through the first passage of the intake manifold and to the cylinders. At 1314, the liquid fuel is injected to the cylinders for combustion with the intake air.

Both 1310 and 1314 proceed to 1316, where the plurality of gas admission valves are cooled. The gas admission valves may be cooled via the gaseous fuel itself flowing through the second passage and/or gas admission valves. Additionally or alternatively, the gas admission valves may be cooled by another type of cooling fluid, such as via the intake air in the first passage and/or via coolant that flows through a third passage of the intake manifold. Method 1300 then returns.

The activation of the liquid fuel injectors and gas admission valves may be performed according to instructions stored on a single controller of the control system. However, in some embodiments the control system may include multiple controllers, and a first controller (e.g., a liquid fuel controller) may control activation of the liquid fuel injectors, while a second controller (e.g., a gaseous fuel controller) may control activation of the gas admission valves. Further, in other embodiments, both the liquid fuel injectors and gas admission valves may be controlled by a single controller, while the supply of gaseous fuel to the gaseous fuel passage of the intake manifold may be controlled by a second controller. For example, the gaseous fuel may be stored in a tank located on a tender car remote from the locomotive on which the engine is installed. The supply of gaseous fuel to the locomotive may controlled by a gas supply valve, pump, etc., controlled by the second controller.

When the gas admission valves are activated to supply gaseous fuel to the cylinders, the gas admission valves are opened. The amount of opening of the gas admission valves, pressure in the second, gaseous fuel passage, and/or duration that the gas admission valves are open may define a gaseous fuel flow rate and ultimately how much gaseous fuel is admitted to the cylinders. The gas admission valves may be operated independently or they may be operated in tandem.

Thus, in an embodiment, a method comprises directing intake air through a first passage of an intake manifold and to a plurality of cylinders of an engine; directing a gaseous fuel through a second passage of the intake manifold; injecting liquid fuel to the plurality of cylinders of the engine for combustion with the intake air; and during a multi-fuel mode, controlling a plurality of gas admission valves mounted to the second passage to open to supply the gaseous fuel to the plurality of cylinders for the combustion with the intake air. The gaseous fuel may be mixed with intake air from the intake manifold via a plurality of inserts coupling the intake manifold to the plurality of cylinders.

The method may further comprise cooling the plurality of gas admission valves by the directing intake air through the first passage of the intake manifold, by the directing gaseous fuel through the second passage of the intake manifold, by the opening of the plurality of the gas admission valves, and/or by directing coolant through a third passage of the intake manifold.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An intake manifold for an engine, comprising:
a first passage providing a first pathway through the intake manifold for supplying intake air to a plurality of cylinders of the engine;
a second passage providing a second pathway through the intake manifold for supplying gaseous fuel to at least one of the plurality of cylinders;
a plurality of gas admission valves mounted to the second passage, a first gas admission valve and a second gas admission valve of the plurality of gas admission valves including respective inlets configured to receive the gaseous fuel flowing through the second passage; and
a plurality of gas runners including a first gas runner coupling the first gas admission valve to a first mixing region of the first passage, the first mixing region positioned at an intersection between the first passage and a first air intake runner.

2. The intake manifold of claim 1, wherein the first and second gas admission valves are configured to control a flow rate of the gaseous fuel to a respective cylinder, and wherein the first passage includes a first longitudinal axis and the second passage includes a second longitudinal axis, parallel to the first longitudinal axis.

3. The intake manifold of claim 2, wherein the engine comprises a plurality of cylinder heads, each cylinder head defining a respective cylinder of the plurality of cylinders, and wherein each respective gas runner of the plurality of gas runners couples a respective gas admission valve to a respective cylinder head, and thereby to allow a flow of the gaseous fuel from the second passage to the cylinder of the respective cylinder head.

4. The intake manifold of claim 3, wherein the gas runner is one of the plurality of gas runners and each gas runner defines a respective channel of the intake manifold, and wherein intake air flowing through the first passage is maintained fluidically separate from gaseous fuel flowing through the second passage.

5. The intake manifold of claim 3, wherein the first passage of the intake manifold comprises a plurality of intake air ports, and a first cylinder head is coupled to a first intake air port and a second cylinder head is coupled to a second intake air port, and the intake manifold is configured to supply intake air to a first cylinder and a second cylinder through a respective intake air port.

6. The intake manifold of claim 5, wherein each gas runner comprises a first end coupled to the second passage and a second end fluidically coupled to a respective one of the intake air ports via a passageway, each intake air port further comprising a mixing region where the intake air and gaseous fuel mix before being directed to a respective cylinder head.

7. The intake manifold of claim 2, further comprising a third passage providing a third pathway through the intake manifold for directing coolant to and/or from a cooling system component.

8. The intake manifold of claim 7, wherein the first passage comprises a first volume, the second passage comprises a second volume, and the third passage comprises a third volume, the first volume larger than the second volume, the third volume larger than the second volume, wherein the first volume is an entirety of an interior space of the first passage, the second volume is an entirety of an interior space of the second passage, and the third volume is an entirety of an interior space of the third passage.

9. The intake manifold of claim 7, wherein the first passage is arranged vertically below the second passage and the third passage, and wherein the second passage is arranged vertically above the third passage.

10. The intake manifold of claim 7, wherein the first passage, the second passage, and the third passage are integrated in the intake manifold.

11. The intake manifold of claim 2, wherein the intake manifold is a first intake manifold having four gas admission valves, wherein the first intake manifold further comprises a first coupling flange on a first end of the first intake manifold and a second coupling flange on a second end of the first intake manifold, the first and second coupling flanges each configured to couple to a coupling flange of a second intake manifold or to an end piece.

12. The intake manifold of claim 11, wherein the engine is a multi-cylinder engine having a first bank of cylinders and a second bank of cylinders, wherein the first intake manifold is disposed between the first and second banks, and wherein half of the gas admission valves are configured to supply gaseous fuel to respective cylinders of the first bank and the other half of the gas admission valves are configured to supply gaseous fuel to respective cylinders of the second bank.

13. An intake manifold for an engine, comprising:
a first passage for supplying intake air to a plurality of cylinders of the engine, the first passage including a plurality of intake air ports, each intake air port coupling the first passage to a respective cylinder of the plurality of cylinders;
a second passage for directing coolant from the engine to a cooling system component;
a third passage for supplying gaseous fuel to the plurality of cylinders; and
a plurality of gas runners, each gas runner comprising a respective channel fluidically coupled to the third passage and to the first passage and traversing through the second passage.

14. The intake manifold of claim 13, wherein the engine comprises a plurality of cylinder heads, each cylinder head defining a respective cylinder of the plurality of cylinders, wherein the intake manifold further comprises a plurality of gas admission valves mounted to the third passage for regulating admission of the gaseous fuel to the plurality of cylinders, the gas admission valves respectively fluidically coupled to the cylinder heads by the plurality of gas runners, and wherein the intake manifold is configured for the gaseous fuel from the third passage to flow through the plurality of gas runners to reach the plurality of cylinders.

15. The intake manifold of claim 14, wherein the first passage, second passage, and third passage are vertically aligned along a central axis of the intake manifold.

16. An engine system, comprising:
an engine having a plurality of cylinders, each cylinder defined by a respective cylinder head; and
an intake manifold to supply intake air to the engine via a first passage, direct coolant out of the engine via a second passage, and supply gaseous fuel to the engine via a third passage, the second passage and the third passage each positioned in vertical alignment above the first passage.

17. The engine system of claim 16, wherein each cylinder of the engine is coupled to at least one respective fuel injector configured to inject liquid fuel for combustion, and the intake manifold further comprises at least one gas admission valve coupled to the third passage for controlling the supply of gaseous fuel to the engine, and wherein the second passage is positioned intermediate the first passage.

18. The engine system of claim 17, further comprising a control system configured to control the at least one respective fuel injector during engine operation and to control the at least one gas admission valve to supply gaseous fuel to the engine during a multi-fuel operating mode, and wherein the intake manifold comprises a central axis that extends from a top of the third passage to a bottom of the first passage, and each of the first passage, second passage, and third passage is vertically aligned along the central axis.

19. The engine system of claim 17, wherein the intake manifold further comprises a plurality of gas runners extending from the third passage to the first passage and traversing the second passage, and each gas admission valve is fluidically coupled to a respective cylinder head via a respective one of the plurality of gas runners.

20. The engine system of claim 19, wherein the first passage of the intake manifold further comprises a plurality of intake air ports, each cylinder head coupled to a respective one of the intake air ports, and wherein the intake manifold is configured for gaseous fuel from the plurality of gas runners to respectively mix with intake air at the intake air ports before being directed to respective cylinder heads.

* * * * *